(12) United States Patent
Quan et al.

(10) Patent No.: US 11,438,913 B2
(45) Date of Patent: Sep. 6, 2022

(54) RESOURCE SCHEDULING METHOD, RADIO ACCESS NETWORK DEVICE, AND TERMINAL DEVICE

(71) Applicant: Huawei Technologies Co., Ltd., Shenzhen (CN)

(72) Inventors: Wei Quan, Beijing (CN); Jian Zhang, Shenzhen (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 16/828,574

(22) Filed: Mar. 24, 2020

(65) Prior Publication Data

US 2020/0229208 A1 Jul. 16, 2020

Related U.S. Application Data

(63) Continuation of application No. 16/518,631, filed on Jul. 22, 2019, now Pat. No. 10,631,313, which is a (Continued)

(30) Foreign Application Priority Data

Jan. 23, 2017 (CN) .......................... 201710058867.6

(51) Int. Cl.
*H04W 4/00* (2018.01)
*H04W 72/12* (2009.01)
*H04W 28/02* (2009.01)

(52) U.S. Cl.
CPC ..... *H04W 72/121* (2013.01); *H04W 28/0278* (2013.01); *H04W 72/1242* (2013.01); *H04W 72/1268* (2013.01)

(58) Field of Classification Search
None
See application file for complete search history.

(56) References Cited

U.S. PATENT DOCUMENTS

2010/0254321 A1 10/2010 Kim et al.
2012/0307767 A1* 12/2012 Yamada ................ H04W 74/02
370/329

(Continued)

FOREIGN PATENT DOCUMENTS

CN 102833857 A 12/2012
CN 104170491 A 11/2014
(Continued)

OTHER PUBLICATIONS

K. V. et al., "Uplink Buffer Status Reporting for Delay Constrained Flows in 3GPP Long Term Evolution," 2009 IEEE Wireless Communications and Networking Conference, pp. 1-6, Institute of Electrical and Electronics Engineers, New fork, New York (May 12, 2009).

(Continued)

*Primary Examiner* — Clemence S Han
(74) *Attorney, Agent, or Firm* — Leydig, Voit & Mayer, Ltd.

(57) ABSTRACT

A resource scheduling method is provided, including: determining, by a terminal device, a first scheduling request based on uplink data, where the first scheduling request corresponds to a first service group; determining, by the terminal device based on the first service group, a first scheduling request resource used to send the first scheduling request, where the first service group is one of a plurality of service groups, and each of the plurality of service groups corresponds to one scheduling request resource; sending, by the terminal device, the first scheduling request to a radio access network device by using the first scheduling request resource; receiving, by the radio access network device, the (Continued)

first scheduling request from the terminal device by using the first scheduling request resource; and determining, by the radio access network device, a first uplink resource in response to the first scheduling request.

22 Claims, 5 Drawing Sheets

Related U.S. Application Data continuation of application No. PCT/CN2018/071277, filed on Jan. 4, 2018.

(56) References Cited

U.S. PATENT DOCUMENTS

| | | |
|---|---|---|
| 2013/0150061 A1 | 6/2013 | Shin et al. |
| 2013/0250828 A1 | 9/2013 | Chou et al. |
| 2014/0092785 A1 | 4/2014 | Song et al. |
| 2015/0049697 A1 | 2/2015 | Worrall et al. |
| 2015/0078231 A1* | 3/2015 | Bergstrom ........ H04W 72/1268 370/311 |
| 2015/0117319 A1* | 4/2015 | Yang ................... H04W 74/004 370/329 |
| 2015/0334637 A1* | 11/2015 | Kim ................... H04W 52/365 370/312 |
| 2016/0119945 A1 | 4/2016 | Fang et al. |
| 2016/0157256 A1 | 6/2016 | Tseng |
| 2017/0048857 A1 | 2/2017 | Vajapeyam et al. |
| 2017/0202009 A1 | 7/2017 | Kim et al. |
| 2017/0245294 A1 | 8/2017 | Worrall et al. |
| 2017/0290026 A1 | 10/2017 | Li et al. |
| 2018/0077719 A1 | 3/2018 | Nory et al. |
| 2018/0132268 A1 | 5/2018 | Zhang et al. |
| 2018/0176937 A1 | 6/2018 | Chen et al. |
| 2018/0199334 A1* | 7/2018 | Ying ................. H04W 72/0413 |
| 2018/0206212 A1 | 7/2018 | Jiang |
| 2018/0249513 A1 | 8/2018 | Chang et al. |
| 2018/0332626 A1* | 11/2018 | You ........................ H04W 74/00 |
| 2019/0007171 A1* | 1/2019 | Gao ........................... H04L 1/08 |
| 2019/0045524 A1 | 2/2019 | Pettersson |
| 2019/0124674 A1 | 4/2019 | Lee et al. |
| 2020/0029353 A1* | 1/2020 | Xu ..................... H04W 72/1284 |
| 2021/0021454 A1* | 1/2021 | Horiuchi ............. H04W 52/346 |

FOREIGN PATENT DOCUMENTS

| | | |
|---|---|---|
| CN | 106856630 A | 6/2017 |
| EP | 2728950 A2 | 5/2014 |
| WO | 2011087406 A1 | 7/2011 |
| WO | 2013138983 A1 | 9/2013 |
| WO | 2016010227 A1 | 1/2016 |

OTHER PUBLICATIONS

"Overview of MAC grant handling in NR," 3GPP TSG-RAN WG2 #94, Nanjing, P.R. China, R2-164026, pp. 1-4, 3rd Generation Partnership Project, Valbonne, France (May 23-27, 2016).
EP/18742090.6-1215, Search Report, dated Dec. 4, 2019.

* cited by examiner

RESOURCE SCHEDULING METHOD, RADIO ACCESS NETWORK DEVICE, AND TERMINAL DEVICE

CROSS-REFERENCE TO RELATED APPLICATIONS

This application is a continuation of U.S. application Ser. No. 16/518,631, filed on Jul. 22, 2019, which is a continuation of International Application No. PCT/CN2018/071277, filed on Jan. 4, 2018, which claims priority to Chinese Patent Application No. 201710058867.6, filed on Jan. 23, 2017. All of the afore-mentioned patent applications are hereby incorporated by reference in their entireties.

TECHNICAL FIELD

The present invention relates to the communications field, and in particular, to a resource scheduling method, a radio access network device, a terminal device, and a communications system.

BACKGROUND

In a Long Term Evolution (LTE) system, downlink transmission is based on orthogonal frequency division multiplexing (OFDM), and uplink transmission is based on single carrier frequency division multiple access (SC-FDMA). LTE supports frequency division duplex (FDD) and time division duplex (TDD). In an FDD system, downlink transmission and uplink transmission are performed on different carriers. In a TDD system, uplink transmission and downlink transmission are performed on a same carrier at different time. Service transmission is based on scheduling by a radio access network device, such as a base station. A basic time unit for scheduling by the base station is one subframe.

Currently, in a wireless communications system, data communication between user equipment (UE) and a network device is implemented by scheduling a resource by the network device for the UE. For example, when the UE performs data communication with an evolved NodeB (eNB) in the LTE (LTE) system, a total amount of uplink data that may be sent by the UE to the eNB at a specific moment is determined by an uplink grant (UL grant) allocated by the eNB. A specific scheduling process is as follows: An eNB sends a control channel, such as a physical downlink control channel (PDCCH) or an enhanced PDCCH (EPDCCH). The control channel may carry scheduling information of a data channel, such as a physical downlink shared channel (PDSCH) or a physical uplink shared channel (PUSCH). The scheduling information includes control information, such as resource allocation information and a modulation and coding scheme. The UE detects the control channel in a subframe, and receives a downlink data channel or sends an uplink data channel based on the scheduling information that is carried on the detected control channel.

When the UE needs to send data in uplink, the UE requests an uplink resource from the eNB. Then the eNB determines whether to allocate a resource to the UE and a quantity of resources to be allocated, and delivers uplink grant information. The existing resource allocation is performed according to a request of each UE. An appropriate resource is allocated to each UE, and the UE continues to transmit uplink data.

However, UE currently needs to process a relatively large quantity of services, and with development of communications technologies, UE needs to process more diverse services in a future communications system. UE and a base station are faced with increasingly diverse service, and different services have different requirements for a service scheduling process. An existing resource scheduling mode can no longer meet a requirement. Particularly, when UE is faced with a plurality of types of service data or service data with a plurality of requirements, appropriate scheduling and processing cannot be performed, thereby reducing service processing efficiency.

SUMMARY

Embodiments of the present invention provides a resource scheduling method, a radio access network device, a terminal device, and a communications system, so as to improve service processing efficiency when service types are diverse.

The following technical solutions are used in the embodiments of the present invention to achieve the foregoing objective.

According to a first aspect, an embodiment of the present invention provides a resource scheduling method. The method includes:

receiving, by a radio access network device, a first scheduling request from a terminal device by using a first scheduling request resource, where the first scheduling request resource corresponds to a first service group in a plurality of service groups, and the first scheduling request is used to request the radio access network device to allocate an uplink resource;

determining, by the radio access network device, a first uplink resource in response to the first scheduling request, where the first uplink resource is used to carry uplink data that corresponds to the first service group and that is sent by the terminal device to the radio access network device; and sending, by the radio access network device, first uplink scheduling information to the terminal device, where the first uplink scheduling information is used to indicate the first uplink resource; where each of the plurality of service groups corresponds to one scheduling request resource.

According to the resource scheduling method, the radio access network device may perform grouped resource scheduling, thereby improving service processing efficiency of the radio access network device.

In a possible design, the radio access network device receives first uplink data from the terminal device by using the first uplink resource, where the first uplink data includes first buffer status report information, and the first buffer status report information is used to indicate a data amount of service data that is of the first service group and that is buffered by the terminal device.

In a possible design, the first uplink data further includes the service data of the first service group.

According to this possible design, the first buffer status report information and the service data of the first service group are transmitted together on the first uplink resource, thereby saving signaling.

In a possible design, the radio access network device determines a second uplink resource based on the first buffer status report information, where the second uplink resource is used to carry the service data that is of the first service group and that is sent by the terminal device to the radio access network device, and the radio access network device sends second uplink scheduling information to the terminal device, where the second uplink scheduling information is used to indicate the second uplink resource.

In a possible design, the first uplink data further includes second buffer status report information, and the second buffer status report information is used to indicate a data amount of service data that is of a second service group and that is buffered by the terminal device, where the second service group is a service group, different from the first service group, in the plurality of service groups.

According to this possible design, in addition to the uplink data corresponding to the first service group, the uplink data corresponding to the second service group is also transmitted on the first uplink resource, thereby improving resource scheduling efficiency of the radio access network device.

In another possible design, the radio access network device determines a third uplink resource based on the second buffer status report information, where the third uplink resource is used to carry the service data that is of the second service group and that is sent by the terminal device to the radio access network device; and the radio access network device sends third uplink scheduling information to the terminal device, where the third uplink scheduling information is used to indicate the third uplink resource.

In a possible design, the first uplink data further includes the service data of the second service group.

In a possible design, the radio access network device is further configured to receive a second scheduling request from the terminal device by using the first scheduling request resource, where the second scheduling request is used to request the radio access network device to allocate an uplink resource for uplink data of the second service group;

the radio access network device determines a fourth uplink resource in response to the second scheduling request, where the fourth uplink resource is used to carry the uplink data that corresponds to the second service group and that is sent by the terminal device to the radio access network device; and the radio access network device sends fourth uplink scheduling information to the terminal device, where the fourth uplink scheduling information is used to indicate the fourth uplink resource, where the second service group is a service group, different from the first service group, in the plurality of service groups.

According to this possible design, the radio access network device receives, by using the first uplink resource, scheduling requests corresponding to the two service groups, thereby improving resource scheduling efficiency and saving signaling.

In a possible design, the radio access network device receives, by using the first uplink resource or the fourth uplink resource, the uplink data corresponding to the second service group, where the uplink data corresponding to the second service group includes second buffer status report information corresponding to the second service group, and the second buffer status report information is used to indicate a data amount of service data that is of the second service group and that is buffered by the terminal device.

In a possible design, the uplink data corresponding to the second service group further includes the service data of the second service group.

Embodiments of the present invention provides another resource scheduling method, including:

determining, by a terminal device, a first scheduling request based on uplink data, where the first scheduling request corresponds to a first service group;

determining, by the terminal device based on the first service group, a first scheduling request resource used to send the first scheduling request, where the first service group is one of a plurality of service groups, and each of the plurality of service groups corresponds to one scheduling request resource; and sending, by the terminal device, the first scheduling request to a radio access network device by using the first scheduling request resource, where the first scheduling request is used to request the radio access network device to allocate an uplink resource.

According to the resource scheduling method, the terminal device may perform grouped scheduling for different types of services, thereby improving service processing efficiency of the terminal device.

In a possible design, the terminal device receives first uplink scheduling information from the radio access network device, where the first uplink scheduling information is used to indicate a first uplink resource, and the first uplink resource is used to carry uplink data that corresponds to the first service group and that is sent by the terminal device to the radio access network device; and the terminal device sends first uplink data to the radio access network device by using the first uplink resource, where the first uplink data includes first buffer status report information, and the first buffer status report information is used to indicate a data amount of service data that is of the first service group and that is buffered by the terminal device.

In a possible design, the first uplink data further includes the service data of the first service group.

In a possible design, the terminal device receives second uplink scheduling information from the radio access network device, where the second uplink scheduling information is used to indicate a second uplink resource, and the second uplink resource is used to carry the service data that is of the first service group and that is sent by the terminal device to the radio access network device; and the terminal device sends the service data of the first service group to the radio access network device by using the second uplink resource.

In a possible design, the first uplink data further includes second buffer status report information; and the second buffer status report information is used to indicate a data amount of service data that is of the second service group and that is buffered by the terminal device, where the second service group is a service group, different from the first service group, in the plurality of service groups.

In a possible design, the terminal device receives third uplink scheduling information from the radio access network device, where the third uplink scheduling information is used to indicate a third uplink resource, and the third uplink resource is used to carry the service data that is of the second service group and that is sent by the terminal device to the radio access network device; and the terminal device sends the service data of the second service group to the radio access network device by using the third uplink resource.

In a possible design, the first uplink data further includes the service data of the second service group.

In a possible design, the terminal device further determines a second scheduling request based on the uplink data, where the second scheduling request corresponds to a second service group; and the terminal device further sends the second scheduling request to the radio access network device by using the first scheduling request resource, where the second scheduling request is used to request the radio access network device to allocate an uplink resource for uplink data corresponding to the second service group, where the second service group is a service group, different from the first service group, in the plurality of service groups.

According to this possible design, in addition to the uplink data corresponding to the first service group, the uplink data corresponding to the second service group is also transmitted on the first uplink resource, thereby improving resource scheduling efficiency of the terminal device.

In a possible design, the terminal device is configured to receive fourth uplink scheduling information from the radio access network device, where the fourth uplink scheduling information is used to indicate a fourth uplink resource, and the fourth uplink resource is used to carry the uplink data that corresponds to the second service group and that is sent by the terminal device to the radio access network device; and the terminal device sends, to the radio access network device by using the fourth uplink resource, the uplink data corresponding to the second service group, where the uplink data corresponding to the second service group includes second buffer status report information corresponding to the second service group, and the second buffer status report information is used to indicate a data amount of service data that is of the second service group and that is buffered by the terminal device.

In a possible design, the uplink data corresponding to the second service group further includes the service data of the second service group.

In a possible design, the determining, by a terminal device, a first scheduling request based on uplink data includes:

determining, by the terminal device, at least one service group corresponding to the uplink data; and determining the first scheduling request corresponding to the first service group if the terminal device determines that the first service group in the at least one service group has a highest priority.

According to this possible design, the terminal device may perform grouped scheduling on a service group based on a priority, thereby preferably performing scheduling on a high-priority service group and improving service processing efficiency.

In a possible design, the terminal device determines that the first scheduling request resource and a fifth uplink resource overlap in a first time period, where the fifth uplink resource is used to carry uplink data that corresponds to a third service group and that is sent by the terminal device to the radio access network device;

the terminal device determines that a priority of the third service group is higher than the priority of the first service group, and sends the uplink data of the third service group by using the fifth uplink resource; and the terminal device sends the first scheduling request on a resource, other than the first time period, of the first scheduling request resource.

According to this possible design, an uplink resource conflict is resolved, and more appropriate grouped service scheduling is implemented.

In all the related possible designs, an attribute of the third uplink resource is different from an attribute of the second uplink resource, and the attribute includes one or more of the following: a resource period, a transmission time interval (TTI), a subcarrier spacing, a resource coding scheme, a multiple access mode, a quantity of carriers occupied in frequency domain, a quantity of times of repeated transmission in frequency domain, and a quantity of times of repeated transmission in time domain.

According to the possible designs, a resource with a corresponding attribute is configured for each service group, thereby meeting a requirement of each service group and improving service scheduling efficiency.

In all the possible designs, the radio access network device determines the plurality of service groups based on a first attribute, where services in each of the plurality of service groups have a same attribute value of the first attribute or have similar attribute values of the first attribute. The first attribute may be a service attribute or another attribute.

According to the possible designs, the plurality of service groups may be obtained through division based on the attribute, thereby implementing more appropriate grouped service scheduling.

According to a second aspect, a radio access network device is provided, including a receiving unit, a processing unit, and a sending unit, where the receiving unit is configured to receive a first scheduling request from a terminal device by using a first scheduling request resource, where the first scheduling request resource corresponds to a first service group in a plurality of service groups, and the first scheduling request is used to request the radio access network device to allocate an uplink resource;

the processing unit is configured to determine a first uplink resource in response to the first scheduling request, where the first uplink resource is used to carry uplink data that corresponds to the first service group and that is sent by the terminal device to the radio access network device; and the sending unit is configured to send first uplink scheduling information to the terminal device, where the first uplink scheduling information is used to indicate the first uplink resource; where each of the plurality of service groups corresponds to one scheduling request resource.

Embodiments of the present invention further provides a terminal device, including a processing unit and a sending unit, where the processing unit is configured to determine a first scheduling request based on uplink data, where the first scheduling request corresponds to a first service group;

the processing unit is further configured to determine, based on the first service group, a first scheduling request resource used to send the first scheduling request, where the first service group is one of a plurality of service groups, and each of the plurality of service groups corresponds to one scheduling request resource; and the sending unit is configured to send the first scheduling request to a radio access network device by using the first scheduling request resource, where the first scheduling request is used to request the radio access network device to allocate an uplink resource.

According to a third aspect, another radio access network device is provided, including:

a receiver, configured to receive a first scheduling request from a terminal device by using a first scheduling request resource, where the first scheduling request resource corresponds to a first service group in a plurality of service groups, and the first scheduling request is used to request the radio access network device to allocate an uplink resource;

a processor, configured to determine a first uplink resource in response to the first scheduling request, where the first uplink resource is used to carry uplink data that corresponds to the first service group and that is sent by the terminal device to the radio access network device; and a transmitter, configured to send first uplink scheduling information to the terminal device, where the first uplink scheduling information is used to indicate the first uplink resource; where each of the plurality of service groups corresponds to one scheduling request resource.

Embodiments of the present invention further provides another terminal device, including:

a processing unit, configured to determine a first scheduling request based on uplink data, where the first scheduling request corresponds to a first service group; where the processing unit is further configured to determine, based on the first service group, a first scheduling request resource used to send the first scheduling request, where the first service group is one of a plurality of service groups, and each of the plurality of service groups corresponds to one scheduling request resource; and a sending unit, configured to send the first scheduling request to a radio access network device by using the first scheduling request resource, where the first scheduling request is used to request the radio access network device to allocate an uplink resource.

According to a fourth aspect, the present invention provides a computer-readable storage medium. The computer-readable storage medium stores an instruction. When the instruction runs on a computer, the computer is enabled to perform the methods in the foregoing aspects.

According to a fifth aspect, the present invention provides a computer program product including an instruction. When the instruction runs on a computer, the computer is enabled to perform the methods in the foregoing aspects.

According to a sixth aspect, the present invention provides a communications system, including the foregoing terminal device and the foregoing radio access network device.

According to the resource scheduling method, the radio access network device, the terminal device, and the communications system provided in the present invention, service groups are obtained through grouping in the present invention, and a corresponding scheduling request resource is configured for each service group, so that the radio access network device and the terminal device can perform grouped scheduling for a service that needs to be processed. It can be learned that service processing efficiency can be improved according to the present invention.

BRIEF DESCRIPTION OF DRAWINGS

To describe the technical solutions in the embodiments of the present invention more clearly, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the implementations of the present invention in detail with reference to the accompanying drawings.

Figure 1:
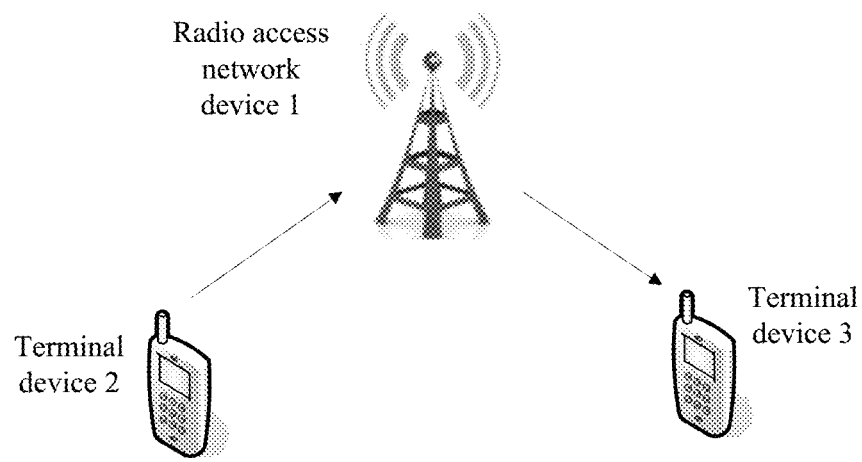
FIG. 1 is an architectural diagram of a network system to which a resource scheduling method provided in an embodiment of the present invention is applied.

FIG. 1 shows an example architecture of a network system to which a resource scheduling method provided in an embodiment of the present invention may be applied. The system includes a radio access network device 1 and a terminal device 2. In this embodiment of the present invention, the radio access network device 1 serves the terminal device 2. An actual communications system is not limited thereto. The radio access network device 1 may further serve a plurality of other terminal devices (in the figure, for example, a terminal device 3 is used to represent the other terminal devices, and a quantity of the other terminal devices is not limited). Specifically, the radio access network device 1 configures a corresponding uplink resource for each terminal device. The uplink resource is used by the corresponding terminal device to send uplink control information and/or uplink data.

Figure 2:
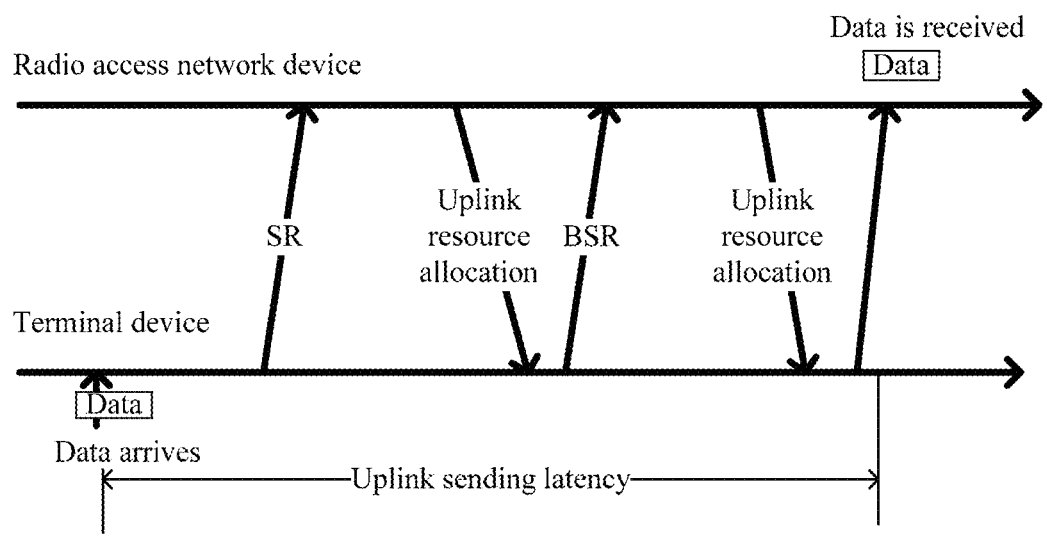
FIG. 2 is a flowchart of resource scheduling interaction between a terminal device and a radio access network device in the prior art.

FIG. 2 is a flowchart of triggering, by a terminal device, a scheduling request to transmit uplink data in the prior art. It can be learned from FIG. 2 that, when the terminal device needs to send uplink data, the terminal device sends a scheduling request (SR) through a physical uplink control channel (PUCCH). Specifically, a radio access network device configures an SR resource for the terminal device in advance. Usually, a specific period is configured for the SR resource. If the terminal device does not need to send uplink data, the terminal device does not send any signal on the SR resource that occurs periodically. On the contrary, once the terminal device needs to send uplink data, the terminal device may send an SR signal on the SR resource that occurs periodically. The radio access network device determines, by detecting energy of the SR resource, whether the terminal device has sent an SR. A PUCCH format used to send an SR in an LTE system is a PUCCH format 1.

In response to the SR, the radio access network device delivers an uplink grant (UL grant) by using an uplink scheduling command, and first configures a small resource for the terminal device for use. Then the terminal device notifies the radio access network device of a data amount that the terminal device needs to transmit. The data amount is reported in a form of a buffer status report (BSR). After receiving the BSR reported by the terminal device and making a comprehensive analysis based on the BSR reported by the terminal device, an existing resource of the radio access network device, and the like, the radio access network device determines whether to allocate a resource to the terminal device. If a condition is not met, the radio access network device allocates no resource to the terminal device. After a plurality of SR failures, the terminal device re-initiates random access. This is not specifically explained or limited herein.

In an existing LTE system, to reduce a quantity of information bits transmitted through an air interface, a terminal device reports a BSR in a form of logical channel groups. In LTE, a maximum of four logical channel groups (LCG) may be configured. One or more logical channels are grouped into one logical channel group. No priority is defined for the logical channel groups. A logical channel group number LCGID is configured through Radio Resource Control (RRC). However, an existing protocol may stipulate a specific LCGID value for some specific logical channels. For example, for signaling radio bearer (SRB) logical channels SRB 0, SRB 1, and SRB 2, a fixed configuration is LCGID=0. In an actual communication process, a radio access network device controls, by using RRC signaling, a BSR reporting process by configuring two timers: a periodic BSR timer "periodicBSR-Timer" and a retransmission BSR timer "retxBSR-Timer", and groups each logical channel into a logical channel group by using RRC signaling. A plurality of types of BSRs are defined in the prior art. The buffer status report BSR mentioned in the embodiments of the present invention is a BSR other than a padding BSR, such as a regular BSR, a periodic BSR, or another type of BSR that may occur in a future new radio system.

LTE further supports a carrier aggregation (CA) technology, to be specific, a plurality of carriers are configured by the radio access network device for one terminal device to increase a data rate of the terminal device. On the plurality of carriers, synchronous sending is performed in time domain. The terminal device may separately detect a PDCCH that schedules each carrier, and sends uplink data on a corresponding uplink resource. A specific detection process of each carrier is similar to that in the foregoing single-carrier case. A resource may be scheduled in a CA or non-CA manner according to a condition of the radio access network device and an actual scheduling requirement.

It can be learned from FIG. 2 that there is a sending latency in a process in which uplink data arrives at the terminal device, the terminal device is triggered to send the uplink data, the terminal device sends an SR to the radio access network device, the radio access network device allocates an uplink resource for the first time, the terminal device sends a BSR to the radio access network device, and then the radio access network device allocates an uplink resource again. In addition, if the terminal device needs to process a plurality of different types of services and send corresponding types of uplink data, for some service types that require relatively high quality of service (QoS), a longer latency and retransmission are caused, and service processing efficiency is reduced.

Therefore, the embodiments of the present invention provide a resource scheduling method, a radio access network device, user equipment, and a communications system, to implement grouped scheduling and processing based service groups, and improve service processing efficiency.

It should be noted that the technical solutions in the embodiments of the present invention may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should be further understood that, in the embodiments of the present invention, a terminal device may be user equipment UE, a mobile station (MS), a mobile terminal, or the like. The terminal device may communicate with one or more core networks through a radio access network (RAN). For example, the terminal device may be a mobile phone (or referred to as a "cellular" phone) or a computer having a mobile terminal. For example, the terminal device may also be a portable, pocket-sized, handheld, computer built-in, or in-vehicle mobile apparatus, which exchanges voice and/or data with the radio access network.

In the embodiments of the present invention, a radio access network (RAN) device is configured to connect to the terminal device. The RAN device corresponds to different devices in different systems. The RAN device may be a base station, such as an evolved NodeB (eNB, or e-NodeB) in LTE or LTE-A, a NodeB or RNC in UMTS; or may be a base station in another communications system, such as a base transceiver station (BTS) or a base station controller (BSC); or may be another device that sends data to the terminal device, such as a small cell, a relay station, a transmission point (TP), or an access point (AP). This is not limited in the embodiments of the present invention.

Embodiment 1

Figure 3:
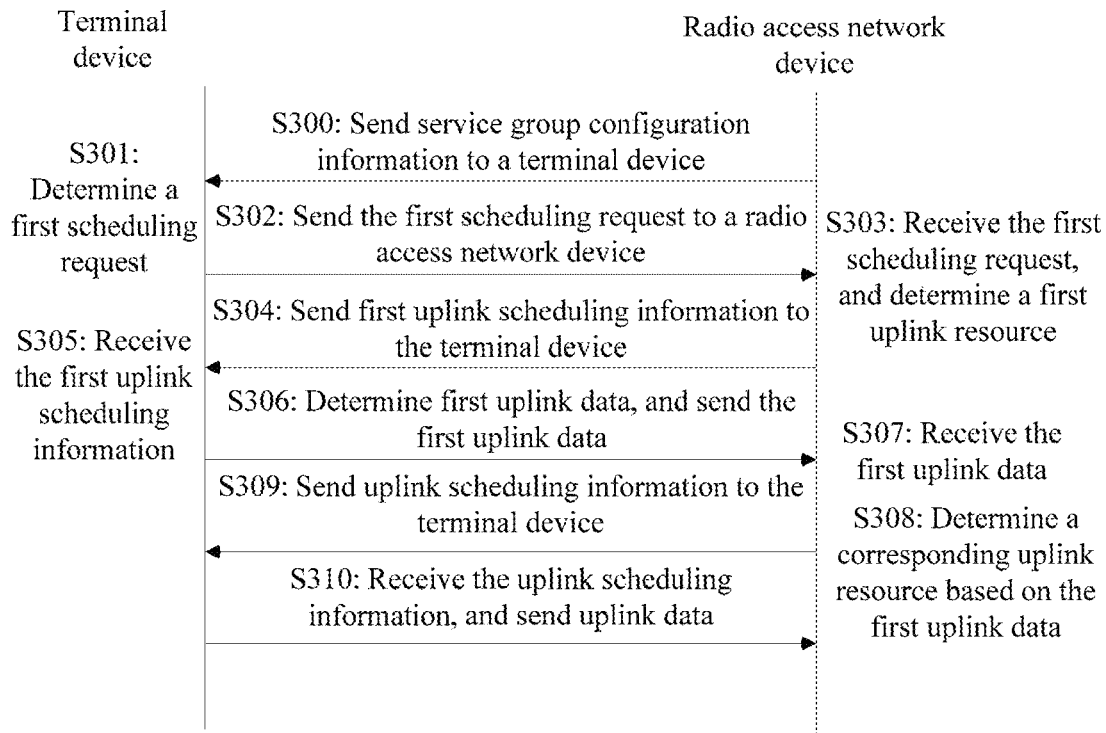
FIG. 3 is a flowchart of a resource scheduling method according to Embodiment 1 of the present invention.

FIG. 3 is a flowchart of a resource scheduling method according to Embodiment 1 of the present invention. The method specifically includes the following steps.

S300: A radio access network device sends service group configuration information to a terminal device, where the service group configuration information is used to instruct the terminal device to request an uplink resource based on the service group configuration information when the terminal device needs to send uplink data.

Next, when the terminal device receives uplink data that needs to be sent, a buffer status report BSR is triggered. Further, the BSR triggers an SR for a corresponding service group. The resource scheduling method in Embodiment 1 of the present invention further includes the following steps.

S301: The terminal device determines a first scheduling request based on uplink data, where the first scheduling request corresponds to a first service group, and the terminal device determines, based on the first service group, a first scheduling request resource used to send the first scheduling request.

The first service group is one of a plurality of service groups. Each of the plurality of service groups corresponds to one scheduling request resource.

S302: The terminal device sends the first scheduling request to the radio access network device by using the first scheduling request resource, where the first scheduling request is used to request the radio access network device to allocate an uplink resource.

S303: The radio access network device receives the first scheduling request from the terminal device by using the first scheduling request resource, and in response to the first scheduling request, the radio access network device determines a first uplink resource.

S304: The radio access network device sends first uplink scheduling information to the terminal device, where the first uplink scheduling information is used to indicate the first uplink resource, and the first uplink resource is used to carry uplink data that corresponds to the first service group and that is sent by the terminal device to the radio access network device.

The first scheduling request resource corresponds to the first service group in the plurality of service groups. The first scheduling request is used to request the radio access network device to allocate an uplink resource.

S305: The terminal device receives the first uplink scheduling information from the radio access network device, where the first uplink scheduling information is used to indicate the first uplink resource.

S306: The terminal device determines first uplink data based on the first uplink resource, and sends the first uplink data to the radio access network device by using the first uplink resource.

The first uplink data includes first buffer status report information. The first buffer status report information is used to indicate a data amount of service data that is of the first service group and that is buffered by the terminal device. The first buffer status report information is triggered by the uplink data corresponding to the first service group.

S307: The radio access network device receives the first uplink data by using the first uplink resource.

According to the foregoing resource scheduling method, services are grouped into the plurality of service groups, and each of the plurality of service groups corresponds to one scheduling request resource. Therefore, the terminal device may determine the first service group, and send the first scheduling request on the first scheduling request resource corresponding to the first service group, to request the radio access network device to allocate an uplink resource. The radio access network device determines the first uplink resource based on the first scheduling request received on the first scheduling request resource corresponding to the first service group. According to the method, when the terminal device needs to send uplink data for a plurality of types of services, the terminal device can determine the uplink data corresponding to the first service group from the uplink data for the plurality of types of services, and send, based on the first scheduling request resource corresponding to the first service group, the first scheduling request corresponding to the first service group, so that the access network device and the terminal device may implement grouped service scheduling and processing, and service processing efficiency is improved.

In step S300, in an optional implementation, the service group configuration information is determined by the radio access network device and sent to the terminal device, for example, by using RRC signaling.

Specifically, before step S300, all services or a plurality of specific services that may be processed by the terminal device are grouped into a plurality of service groups. Each service group includes at least one service. The radio access network device configures a corresponding scheduling request resource, such as a PUCCH, for each service group. A scheduling request resource corresponding to one of the plurality of service groups is configured for the terminal device to send, to the radio access network device, a scheduling request for uplink data corresponding to the one service group. All the services or the plurality of specific services that may be processed by the terminal device may be determined by the access network device; or may be determined based on a definition of a standard or a specification, or the like. This is not specifically limited herein. Based on the division into the plurality of service groups, the terminal device may perform grouped resource scheduling for services, and service processing efficiency of the terminal device is improved when the terminal device needs to process a plurality of types of services.

Optionally, the plurality of different service groups correspond to different priority information. The priority information is used to indicate a degree to which a corresponding service group is preferably scheduled. For example, a higher priority of a service group indicates a higher scheduling priority. Based on the setting of the priority information, when scheduling or processing is to be performed for a plurality of service groups, the radio access network device and the terminal device can determine a service group for which scheduling or processing is to be preferably performed, thereby improving service processing efficiency. The following gives some descriptions of examples of the service group division.

For example, the plurality of service groups are obtained through division based on a specific attribute. For example, the specific attribute may be any service-related attribute.

When the specific attribute is a service attribute, a plurality of service groups are obtained based on different service attributes. At least one service in each service group may have a same service attribute or similar service attributes. Further, a plurality of priorities may be determined based on the service attribute, and a plurality of corresponding service groups are obtained through division based on the plurality of priorities. For example, the service attribute is a transmission latency requirement. A New Radio (NR) communications system includes ultra-reliable and low-latency communications (uRLLC), Enhanced Mobile Broadband (eMBB), and massive machine type communications (mMTC) services. The uRLLC service requires that a data transmission latency be less than 0.5 ms, and that a data transmission success probability be greater than or equal to 99.999%. A latency requirement and a reliability requirement of eMBB are lower than those of the uRLLC service. A latency requirement of the mMTC is even lower. Based on different transmission latency requirements, a base station may specify that services whose transmission latency requirement is less than 0.5 ms belong to one service group, and may further set a priority to "High" or level 1; and specify that services whose transmission latency requirement is greater than 0.5 ms belong to another service group, and may further set a priority to "Low" or level 2. On the basis, two service groups are obtained through division. Alternatively, the base station may obtain more service groups through division by specifying a transmission latency; or further, the base station may determine more priorities based on transmission latencies, to obtain the plurality of service groups through division. It may be understood that the service attribute may be alternatively a transmission reliability requirement, for example, services with different reliability requirements may be grouped into different service groups; or the service attribute may be a data rate requirement, for example, services with different data rate requirements may be grouped into different service groups; or the like. The service attribute may be alternatively a combination of a plurality of different requirements. This is not limited in the present invention.

Further, a scheduling request resource corresponding to each service group is determined based on the service attribute. Attributes of scheduling request resources corresponding to service groups in the plurality of services groups may be different. Based on a difference between service attributes of different service groups, attributes of scheduling request resources configured by the radio access network device for the different service groups may also be different.

Figure 4:
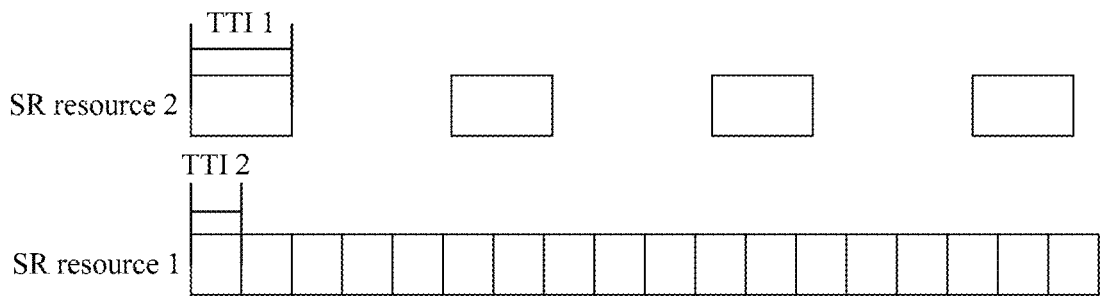
FIG. 4 is a comparison diagram of resource attributes corresponding to different service groups according to Embodiment 1 of the present invention.

The resource attribute includes at least one of a resource period (for example, the period is 1 ms, 2 ms, 5 ms, one TTI length, or two TTI lengths), a transmission time interval (TTI) length (for example, 1-ms TTI, 0.5-ms TTI, a TTI length of two OFDM symbols, or a TTI length of one OFDM symbol), a subcarrier spacing (for example, 15 KHz or 60 KHz), a coding scheme (for example, whether a Turbo code, a low-density parity-check (LDPC) code, or a polar code is used), a multiple access mode (for example, OFDM or Code Division Multiple Access (CDMA)), a quantity of carriers (for example, 12 subcarriers or 15 subcarriers) occupied in frequency domain, whether repeated transmission is performed in frequency domain (a quantity of times of repeated transmission in frequency domain is further included if repeated transmission is performed in frequency domain), and whether repeated transmission is performed in time domain (a quantity of times of repeated transmission in time domain is further included if repeated transmission is performed in time domain). As shown in FIG. 4, for the foregoing two service groups that respectively include the uRLLC service and the eMBB service, an attribute of a scheduling request SR resource 1 configured by the radio access network device for the service group to which the uRLLC service belongs is different from an attribute of a scheduling request SR resource 2 configured for the service group to which the eMBB service belongs. The SR resource 1 may have a shorter period, and further, have a shorter TTI or occupy a larger quantity of carriers in frequency domain.

When the specific attribute is a second attribute other than the service attribute, for example, an actual network status or a requirement of the radio access network device, the radio access network device may further determine different priorities based on the second attribute, and obtain service groups through division based on the second attribute. This is not specifically limited herein.

For another example, the plurality of service groups may be obtained through division based on a logical channel grouping manner in the prior art. To be specific, in an existing LTE system, a terminal device reports a BSR in a form of logical channel groups. In LTE, a maximum of four logical channel groups (LCG) may be configured. One or more logical channels are grouped into one logical channel group. When obtaining logical channel groups through division, a radio access network device does division based on service types according to a same or similar standard, to obtain a plurality of corresponding service groups.

It may be understood that the foregoing service group division and priority determining manners are merely examples for description. The radio access network device or an operator may design different division rules according to actual requirements. This is not limited in the present invention.

In this optional implementation, further, optionally, the radio access network device configures a corresponding scheduling request resource for each service group, and may perform any configuration according to a requirement. For example, the radio access network device may perform configuration based on a current resource usage status. For another example, when the plurality of service groups have corresponding priority information, the radio access network device may further configure a corresponding scheduling request resource for each service group based on the different priority information. Attributes of scheduling request resources corresponding to service groups in the plurality of service groups are different. An attribute of a scheduling request resource corresponds to an attribute of a corresponding service group. For example, when the plurality of service groups are obtained through division based on the transmission latency requirement, scheduling request resources corresponding to different service groups are also configured according to the transmission latency requirement.

It should be noted that, usually, a scheduling request for each service group may be sent to the radio access network device only by using a corresponding scheduling request resource. However, when the plurality of service groups have corresponding priority information, when a scheduling request for a service group having a relatively high priority is sent by using a corresponding scheduling request resource, to improve utilization of the scheduling request resource, a scheduling request corresponding to a service group having a relatively low priority may also be sent on the scheduling request resource. However, a scheduling request resource of a service group having a relatively low priority cannot be used to transmit a scheduling request corresponding to a service group having a relatively high priority, because an attribute of the scheduling request resource of the service group having the relatively low priority may not meet a scheduling requirement of the service group having the relatively high priority. For example, a scheduling request resource corresponding to the uRLLC service may be used to transmit a scheduling request corresponding to the eMBB service, but a scheduling request resource corresponding to the eMBB service cannot be used to transmit a scheduling request corresponding to the uRLLC service. Based on this, when scheduling is preferably performed for a service group having a relatively high priority, scheduling can also be performed for a service group having a relatively low priority, thereby improving utilization of an uplink resource. In addition, when two or more service groups correspond to a same scheduling request resource, the two or more service groups share the same scheduling request resource.

It should be noted that, in this embodiment of the present invention, when priorities of service groups are obtained through division based on the specific attribute, the priorities are not necessarily determined based on a real value corresponding to the specific attribute, but are determined based on a quality of service requirement or a scheduling requirement of the attribute. For example, when the attribute is a transmission latency requirement, a service group that has a smaller value of the transmission latency requirement has a higher quality of service requirement and a higher priority.

Optionally, the service group configuration information includes service group information, service type information, and scheduling request resource information. Each piece of service group information may correspond to a plurality of pieces of service type information. Each piece of service type information uniquely corresponds to one piece of service group information. The service group information and the scheduling request resource information may be in a one-to-one correspondence; or may be not in a one-to-one correspondence, for example, a plurality of pieces of service group information correspond to one piece of scheduling request resource information.

Further, optionally, the service group information is identity information used to indicate a service group, for example, one of more of a group identity (GID), a logical channel group identity, or a radio bearer group identity. When a service group has corresponding priority information, the service group information may be further used to indicate the priority. For example, if the service group information is 1, it indicates that a corresponding service group has a highest priority, and scheduling or processing should be preferably performed for the service group.

Further, optionally, the service type information includes service type identity information used to indicate a service type, for example, one or more of a service type name, a service type identity ID, a QCI corresponding to a service type, a logical channel identity or a priority corresponding to a service type, and a radio bearer identity corresponding to a service type. If the service group information may indicate priority information of a service group or no priority is specified for a service group, the service type information may include only the service type identity information used to uniquely indicate the service type.

In addition, the service type information may further include attribute information. The attribute information may include one or more of an attribute value, attribute priority information, and other information that can be used by the terminal device to determine an attribute corresponding to a service type. This is not specifically limited herein.

If a service group has corresponding priority information, either the attribute value or the attribute priority information may be used to indicate the priority information of the service group. A correspondence between an attribute value or attribute priority information and priority information of a service group may be preconfigured by the access network device for the terminal device, for example, through notification by using RRC signaling.

For the foregoing attribute value, optionally, the attribute value may be a specific attribute value corresponding to a corresponding attribute. Further, the attribute priority information is determined based on the specific attribute value. For example, a plurality of ranges are obtained through division based on attribute values. A service type whose attribute value is within a first range has a highest priority, and an attribute priority is set to 1; a service type whose attribute value is within a second range has a second highest priority, and an attribute priority is set to 2; and so on. The first range and the second range do not overlap. The attribute priority corresponds to the foregoing service group priority. The correspondence may be either of the following two cases: In a first case, attribute values of service types included in a same service group may be different, but attribute priorities of the service types included in the same service group are the same, and a priority of a service group is in a one-to-one correspondence with an attribute priority of a service type. In a second case, a priority of each service group corresponds to one attribute priority range of a service type, in other words, attribute priorities of service types included in a same service group belong to one attribute priority range, and attribute priority ranges corresponding to priorities of service groups in the plurality of service groups do not overlap. For example, if an attribute priority of the uRLLC service is 1, an attribute priority of the eMBB service is 2, and an attribute priority of an mMTC service is 3, the uRLLC service belongs to a service group 1 whose service group priority is 1, and the eMBB service and the mMTC service may belong to a service group 2 whose service group priority is 2 and a service group 3 whose service group priority is 3 respectively, or both the eMBB service and the mMTC service may belong to a service group 2 whose service group priority is 2, in other words, both attribute priorities 2 and 3 correspond to the service group priority 2.

It should be noted that, when the plurality of service groups have corresponding priority information, the priority information needs to be indicated by at least one of the service group information and the service type information. For example, the service group information is also used to indicate a service group priority, and/or the service type information includes information, such as the attribute value or the attribute priority information, used to determine a service group priority.

Further, optionally, the scheduling request resource information includes at least first resource indication information. The first resource indication information is used to indicate a resource, such as a subframe location or a period, used by the terminal device to send a scheduling request for a corresponding service group. Specifically, for example, a period of a scheduling request resource for a specific service group is configured as 2 ms, and the scheduling request may be sent at time points at which subframe numbers are 0, 2, 4, 6, and 8. The scheduling request resource information may further include one or more pieces of resource attribute information of the scheduling request resource, such as a resource period, a TTI length, a quantity of carriers occupied in frequency domain, whether repeated transmission is performed in frequency domain (a quantity of times of repeated transmission in frequency domain is further included if repeated transmission is performed in frequency domain), and whether repeated transmission is performed in time domain (a quantity of times of repeated transmission in time domain is further included if repeated transmission is performed in time domain). This is not specifically limited herein. According to a specific communication requirement, the scheduling request resource information may further include any other resource-related information different from the first resource indication information.

Further, optionally, the service group configuration information is stored in the radio access network device in a form of a mapping table.

Herein, it should be noted that the radio access network device may obtain the plurality of service groups through division based on information such as a definition of a standard or a specification, a requirement of an operator or a vendor, or a specific attribute, and configure the corresponding scheduling request resource, to obtain the service group configuration information. Alternatively, the radio access network device may obtain group information from another network device such as a core network device, and configure the corresponding scheduling request resource for each service group based on the group information, to obtain the service group configuration information. The group information includes one or more pieces of any information related to the service group, such as a service group division manner, a correspondence between each service group and a service type included in the service group, service group information, and service type information. In other words, the radio access network device may obtain the plurality of service groups through division based on any rule or consideration in network communication. This is not specifically limited herein.

In step S301, the first scheduling request resource corresponds to the first service group. The first scheduling request resource may be configured by the radio access network device according to a requirement; or may be configured based on the priority information of the service group. For a specific configuration manner, refer to the descriptions in step S300.

Further, for the first scheduling request:

Optionally, the first scheduling request includes indication information, such as service group information, used to indicate the first service group corresponding to the first scheduling request. Based on this, when the first scheduling request is sent on another uplink resource not corresponding to the first service group, or when a scheduling request resource corresponding to another service group is the same as or partially overlaps with the scheduling request resource corresponding to the first service group, the radio access network device may explicitly indicate, by using the indication information, that the first scheduling request is used by the terminal device to request a resource in response to the uplink data of the first service group.

Further, optionally, if the plurality of service groups correspond to different scheduling request resources, the access network device may determine, based on a resource location of a received scheduling request, a service group of a terminal device that corresponds to the scheduling request. Further, the first scheduling request may further include an identifier of the terminal device, such as a C-RNTI; or the terminal device may allow the radio access network device to identify the terminal device based on a pseudo-random sequence pre-agreed on by the terminal device and the radio access network device.

Further, optionally, a format of the first scheduling request is the same as a scheduling request format in the prior art. For example, a PUCCH format 1 is used in the prior art, and each physical resource block pair (PRB Pair) may include 36 SR resources. Further, the indication information used to indicate the first service group corresponding to the first scheduling request may be added to the first scheduling request.

Further, optionally, a format of the first scheduling request is different from a scheduling request format in the prior art. For example, the format of the first scheduling request may be preconfigured by the radio access network device according to a requirement.

In the prior art, no service group is obtained through division, and there is no scheduling request resource corresponding to each service group. A terminal device can request resource scheduling for all types of services only on a scheduling request SR resource configured by a radio access network device for the terminal device, to request an uplink resource. This cannot meet scheduling requirements of different types of services.

In step S301, in an optional implementation, the terminal device receives the uplink data; determines at least one service type corresponding to the uplink data; determines, based on the service group configuration information received from the radio access network device, at least one service group corresponding to the at least one service type; determines the first service group from the at least one service group; and determines the first scheduling request corresponding to the first service.

Optionally, the terminal device determines, from the at least one service group according to an actual service processing requirement, the first service group that requires processing first; and generates the first scheduling request corresponding to the first service group.

Optionally, the terminal device determines, based on the service group configuration information, service group information and service type information that correspond to the at least one service type; and determines the first service group based on the service group information and the service type information. Based on this, the terminal device can perform grouped service scheduling based on an attribute, thereby improving service processing efficiency.

Further, optionally, the terminal device determines the first service group if the first service group has a highest priority; or if an attribute corresponding to an attribute value of a first service type in the at least one service type has a highest priority; or if an attribute of a first service type in the at least one service type has a highest priority, and the first service type corresponds to the first service group. Based on this, the terminal device can preferably perform scheduling for a service type having a highest priority, thereby reducing a service processing latency. The terminal device may determine, based on an attribute value of the at least one service type, an attribute priority corresponding to the at least one service type, and further determines a priority of the at least one service group corresponding to the at least one service type. For example, if the terminal device determines that the uRLLC service in the at least one service type has a lowest transmission latency requirement, the terminal device determines that a service type corresponding to the uRLLC service has a highest attribute priority, and a service group to which the uRLLC service belongs has a highest priority.

In step S301, in another optional implementation, the terminal device determines, based on the service group configuration information, the first scheduling request resource corresponding to the first service group.

The terminal device determines, based on the service group configuration information, the first resource indication information corresponding to the first service group, and further determines the first scheduling request resource used to send the first scheduling request corresponding to the first service group.

In the prior art, the terminal device can request the resource scheduling for all types of services only on the same scheduling request SR resource configured by the radio access network device for the terminal device. In this case, if a service type, such as the uRLLC service, corresponding to to-be-sent uplink data of the terminal device has a very high requirement for an attribute such as a transmission latency or a packet loss rate, the scheduling request SR resource may not meet the requirement of the service type. This causes a relatively large transmission latency or a relatively high packet loss rate, and further causes a relatively low initial transmission success rate. According to the resource scheduling method provided in this embodiment of the present invention, a service group for which scheduling is to be preferably performed or that has a relatively high priority may be determined, and a scheduling request is sent on a scheduling request resource corresponding to the service group, thereby improving service processing efficiency of the terminal device. In actual communication, by obtaining different service groups through grouping, a transmission latency and/or a packet loss rate can be reduced.

A person skilled in the art may know that, in the prior art, no service group is obtained through division, and no scheduling request resource is configured for each service group. If a terminal device determines that there is an uplink data resource, such as a PUSCH, configured by a radio access network device for the terminal device, the terminal device does not send a scheduling request SR, and sends uplink data by using the currently existing PUSCH. In this embodiment of the present invention, corresponding scheduling request resources are configured for different service groups, and there is inevitably a time conflict between the scheduling request resources and a currently existing uplink resource, such as a PUSCH.

In this embodiment of the present invention, based on the descriptions of step S300, it may be learned that the radio access network device configures the corresponding scheduling request resource for each service group. In an actual communication process, scheduling request resources separately configured for a plurality of service groups may conflict with a PUSCH used to carry uplink data. When the terminal device uses a control channel, such as a PUCCH, to carry a scheduling request, if the scheduling request is transmitted with uplink data together, a single-carrier feature of uplink transmission will be damaged. Particularly, in Release 8 or Release 9, simultaneous transmission of PUCCH and PUSCH is not allowed. In Release 10, a carrier aggregation (CA) technology is introduced. If the terminal device has sufficient power and signal coverage is not affected, the radio access network device may configure the CA technology for the UE, so that simultaneous transmission of PUCCH and PUSCH can be performed.

Based on the foregoing analysis, in step S302, in an optional implementation, before the terminal device sends the first scheduling request to the radio access network device by using the first scheduling request resource, the terminal device determines that the first scheduling request resource and a fifth uplink resource overlap in a first time period, where the fifth uplink resource is used to carry uplink data that corresponds to a third service group and that is sent by the terminal device to the radio access network device; and the terminal device determines content to be sent in the first time period. Specifically, the uplink data corresponding to the third service group may be third buffer status report information corresponding to third service group and/or service data corresponding to the third service group. The third buffer status report information is used to indicate a data amount of the service data that is of the third service group and that is buffered by the terminal device. The third buffer status report information is triggered by the uplink data corresponding to the third service group.

Optionally, if the terminal device determines, based on the service group configuration information, that a service group does not have corresponding priority information, the terminal device sends at least one of the first scheduling request and the uplink data of the third service group in the first time period in a preconfigured conflict processing manner. Correspondingly, the radio access network device receives the at least one of the first scheduling request and the uplink data of the third service group in the first time period.

Optionally, the terminal device determines priority information of the first service group and the third service group based on the service group configuration information, and determines, based on the priority information and in a preconfigured conflict processing manner, the content to be sent in the first time period. The priority information may be determined based on at least one of the service group information and the service type identity information. For details, refer to explanations in step S300. The conflict processing manner may be any one of a plurality of optional manners. The following describes some optional manners as examples.

In a first optional manner, a service group priority is still considered during conflict processing. In a same service group, non-scheduling request uplink data has a higher priority than a scheduling request, and data having a lower priority cannot be simultaneously sent with data having a higher priority, that is:

uplink data of a service 1 (having a high priority)>a scheduling request for the service 1>uplink data of a service 2 (having a low priority)>a scheduling request for the service 2.

For example, a priority of the third service group is higher than a priority of the first service group. The terminal device determines to send the first scheduling request on a resource, other than the first time period, of the first scheduling request resource, and send the uplink data of the third service group on the fifth uplink resource.

For another example, a priority of the third service group is the same as a priority of the first service group. The terminal device determines to send the first scheduling request on a resource, other than the first time period, of the first scheduling request resource, and send the uplink data of the third service group on the fifth uplink resource, where the uplink data of the third service group is non-scheduling request uplink data.

In a second optional manner, in a same service group, non-scheduling request uplink data has a higher priority, a priority of a scheduling request for a service group having a higher priority is the same as a priority of non-scheduling request uplink data of a service group having a lower priority, data having a lower priority cannot be simultaneously sent with data having a higher priority, and data having a same priority may be simultaneously sent, that is:

uplink data of a service 1 (having a high priority)>a scheduling request for the service 1=uplink data of a service 2 (having a low priority)>a scheduling request for the service 2.

For example, a priority of the third service group is higher than a priority of the first service group. The terminal device determines to send the first scheduling request on a resource, other than the first time period, of the first scheduling request resource, and send the uplink data of the third service group on the fifth uplink resource.

For another example, a priority of the third service group is lower than a priority of the first service group. If the uplink data corresponding to the third service group is a scheduling request, the terminal device determines to send the first scheduling request on the first scheduling request resource, and send the uplink data of the third service group on a resource, other than the first time period, of the fifth uplink resource. If the uplink data corresponding to the third service group is not a scheduling request, the terminal device determines to send the first scheduling request on the first scheduling request resource, and send the uplink data of the third service group on the fifth uplink resource.

According to the foregoing priority setting, a time resource conflict can be effectively resolved, and uplink data of a service group having a high priority is preferably sent on a same time resource. In this optional implementation, the preset conflict processing manner may be configured by the radio access network device, and then sent to the terminal device by using a higher layer message, such as an RRC message, to instruct the terminal device to resolve a time resource conflict at least in the preset conflict processing manner; or the preset conflict processing manner may be stipulated in a protocol or a specification, and the terminal device resolves a resource conflict according to the stipulation of the protocol or the specification. This is not specifically limited herein.

It should be noted that, a precondition for simultaneously sending, by the terminal device, different uplink data and/or scheduling requests on a same time resource is that the terminal device has a processing capability for sending a plurality of types of different data and/or scheduling requests on a same time resource. For example, the terminal device may transmit a plurality of pieces of different data in a same TTI, or may simultaneously transmit data and a scheduling request. Alternatively, the terminal device may simultaneously send different uplink data and/or scheduling requests on a same time resource, for example, through frequency multiplexing, without considering a time resource conflict; or different modulation and coding schemes may be used for differentiation, and the radio access network device separately receives different uplink data.

Before step S303, the radio access network device performs detection, based on a specific period or in an aperiodic manner, on the scheduling request resources respectively corresponding to the plurality of service groups, until the first scheduling request is detected on the first scheduling request resource.

In step S303, the radio access network device receives the first scheduling request on the first scheduling request resource, determines that the first scheduling request corresponds to the first service group, and configures the first uplink resource for the uplink data corresponding to the first service group.

For a manner of determining the corresponding first service group based on the first scheduling request, refer to descriptions of step S301.

In an optional implementation, the first uplink resource corresponds to the first service group.

The radio access network device configures a corresponding uplink resource for each of the plurality of service groups. Each service group may be in a one-to-one correspondence with the uplink resource; or may be not in a one-to-one correspondence with the uplink resource, for example, one service group corresponds to a plurality of uplink resources or two or more service groups correspond to a same uplink resource. This is not specifically limited herein. Based on this optional implementation, by separately configuring corresponding uplink resources for the plurality of service groups, grouped management and scheduling can be implemented for the uplink resources, and resource scheduling efficiency of the radio access network device is improved. Specifically, for a manner of configuring, by the radio access network device, the corresponding uplink resource for each service group, refer to the manner of configuring the corresponding scheduling request resource for each service group in step S300.

For example, the radio access network device configures the corresponding uplink resource for each service group based on different service group priorities. Attributes of uplink resources corresponding to service groups in the plurality of service groups are different. The resource attribute includes at least one of a resource period, a TTI length, a subcarrier spacing, a coding scheme (for example, whether a Turbo code, an LDPC code, or a Polar code is used), a multiple access mode (for example, OFDM or CDMA), a quantity of carriers occupied in frequency domain, a quantity of times of repeated transmission in frequency domain, and a quantity of times of repeated transmission in time domain. For example, different service groups have different transmission latency requirements. Comparing a service group having a relatively high transmission latency requirement, such as a service group including the uRLLC service, with a service group having a relatively low transmission latency requirement, such as a service group including the mMTC service, a corresponding uplink resource configured for the service group including the uRLLC service has a shorter resource period and a shorter TTI length, and/or occupies a larger quantity of carriers in frequency domain.

It should be noted that an uplink resource of a service group having a relatively high priority may be used to transmit uplink data corresponding to a service group having a relatively low priority. However, an uplink resource of a service group having a relatively low priority cannot be used to transmit uplink data corresponding to a service group having a relatively high priority. Based on this, service data of a service group having a relatively high priority can be preferably processed. In addition, when a resource is sufficient, uplink data of a service group having a relatively low priority is also sent on an uplink resource of the service group having the relatively high priority, thereby improving resource utilization and service processing efficiency. In another special case, two or more service groups having different priorities may correspond to a same uplink resource. In this case, the two or more service groups corresponding to the same uplink resource share the same uplink resource, and the same uplink resource is shared by grouped scheduling based on service groups in this embodiment of the present invention.

In step S304, the radio access network device sends the first uplink scheduling information to the terminal device. Uplink scheduling information corresponding to service groups in any embodiment of the present invention may be in a same format or in similar formats. The uplink scheduling information may include information indicating one or more of the following:

a physical resource, such as time or a frequency-domain location;

a scheduling and coding scheme;

a new data indicator;

a HARQ process number;

a redundancy version; and a resource attribute.

Specifically, for the resource attribute, different resource attributes may be presented by using different masking manners or different search spaces, or by adding an attribute indication bit, or the like.

Optionally, the radio access network device may process the uplink scheduling information in a plurality of manners, so that the terminal device may determine a service group corresponding to the received uplink scheduling information.

For example, each piece of uplink scheduling information includes indication information used to indicate a service group corresponding to the uplink scheduling information. Using the first uplink scheduling information as an example, the first uplink scheduling information includes the indication information used to indicate the first service group, and the indication information is used to notify the terminal device that the first uplink resource indicated by the first uplink scheduling information corresponds to the first service group. The indication information may be service group information.

For another example, the radio access network device configures a corresponding downlink resource for uplink scheduling information corresponding to each service group. The downlink resource is used to transmit the uplink scheduling information of the corresponding service group. Specifically, the radio access network device notifies the terminal device of a correspondence between the downlink resource and the service group in advance, so that the terminal device may determine, based on the correspondence, the service group corresponding to the uplink scheduling information.

In step S305, the terminal device receives the first uplink scheduling information from the radio access network device, and determines that the first uplink resource indicated by the first uplink scheduling information corresponds to the first service group. For a specific determining manner, refer to descriptions of sending the first uplink scheduling information in step S304. Details are not described herein again.

In step S306, the terminal device determines the first uplink data based on the first uplink resource.

In an optional implementation, to improve resource utilization of the first uplink resource, the terminal device determines whether the first uplink resource may carry more uplink data, for example, whether a remaining resource is available, whether a multiplexing manner may be used, and which multiplexing priority is further to be used. If the first uplink resource may carry more uplink data, the terminal device determines whether the reaming resource is sufficient to carry other data. The other data is at least one of the service data of the first service group, second buffer status report information corresponding to the second service group, service data of the second service group, and the like. In this optional implementation, in response to the first scheduling request, the first uplink resource is configured to carry uplink data in addition to the first buffer status report information, thereby saving signaling resources while improving utilization of the first uplink resource.

Optionally, the terminal device determines, according to a specific rule, the other data carried on the remaining resource.

Figures 5, 6:
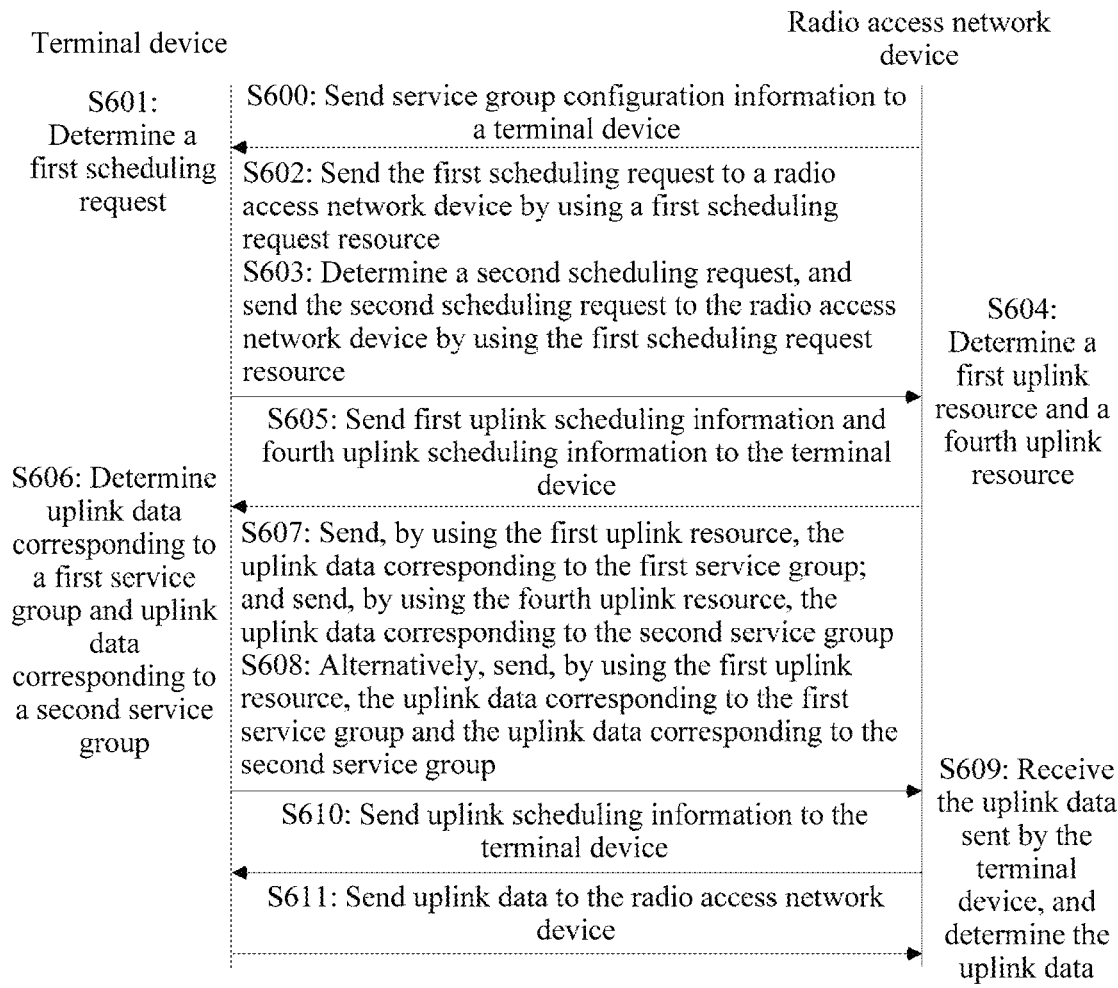
FIG. 5 is a schematic diagram of resource configuration according to Embodiment 1 of the present invention.
FIG. 6 is a flowchart of a resource scheduling method according to Embodiment 2 of the present invention.

Specifically, the remaining resource of the first uplink resource is preferably used to carry the service data of the first service group, and is then used to carry the second buffer status report information corresponding to the second service group. The second buffer status report information is triggered by the uplink data corresponding to the second service group. Whether the service data of the second service group can be still carried is determined only when the remaining resource can be used to carry the second buffer status report information; otherwise, the remaining resource is not used to carry the service data of the second service group, as shown in FIG. 5. After the foregoing determining, if there is still a remaining resource, the remaining resource may be further used to carry the uplink data corresponding to the third service group. Processing is the same as the foregoing processing for the second service group. It is still determined first whether the third buffer status report information corresponding to the third service group can be carried. If the third buffer status report information can be carried, whether the service data of the third service group can be still carried is then determined; otherwise, the remaining resource is not used to carry the service data of the third service group. By analogy, similar determining and processing may be further performed on uplink data of a fourth service group and the like. Finally, the terminal device determines the first uplink data based on a size of the first uplink resource. Herein, it should be noted that, if the terminal device determines that the first uplink resource can be used to send the service data of the first service group but there is no remaining resource to send other information, for example, a BSR corresponding to the first service group, the terminal device sends only the data of the first service group, and does not send the BSR of the first service group or service data or a BSR of another service group; or if the terminal device determines that the first uplink resource can be used to send buffered service data of all service groups but there is no remaining resource to send other information, the terminal device sends only the buffered service data of all the service groups, and does not send a BSR of any service group or the like.

Further, it should be noted that, when the terminal device sends uplink data not belonging to the first service group on the first uplink resource corresponding to the first service group, identity information (such as service group information or a service type identity) used to indicate a service group corresponding to the uplink data not belonging to the first service group needs to be added to the uplink data not belonging to the first service group, so that the radio access network device may explicitly determine a service group corresponding to the uplink data. A specific location for adding or a specific format is not specifically limited herein.

Further, optionally, the terminal device determines the second service group based on the uplink data in step S301.

Specifically, the terminal device determines the at least one service type corresponding to the uplink data; determines, based on the service group configuration information received from the radio access network device, the at least one service group corresponding to the at least one service type; and determines, from the at least one service group, the second service group different from the first service group.

First, optionally, the terminal device determines the second service group based on determining of the first service group.

For example, the terminal device determines, from the at least one service group according to an actual service processing requirement, the second service group that is different from the first service group and that requires processing first.

For another example, the terminal device determines, based on the service group configuration information, the service group information and/or the service type information of the at least one service type; and determines the second service group different from the first service group.

Second, optionally, if the service group configuration information indicates no service group priority information, the terminal device itself may determine the second service group, for example, based on a network status, a capability of the terminal device, or service data amounts corresponding to different service groups. This is not specifically limited herein.

Further, optionally, if the service group configuration information indicates service group priority information, the terminal device determines the second service group if a service group, different from the first service group, corresponding to a second service type in the at least one service type has a highest priority, or an attribute corresponding to an attribute value of a second service type has a highest priority, or an attribute corresponding to a second service type has a highest priority, and the second service type corresponds to the second service group. Based on this, the terminal device can preferably perform scheduling for a service type having a relatively high priority, thereby reducing a service processing latency. For configuration of a service group priority, refer to related descriptions in step S300. Details are not described herein again.

It should be noted that the terminal device may determine the third service group, even the fourth service group, and the like in a similar manner, depending on the size of the first uplink resource and a transmission requirement. For a specific determining manner, refer to related descriptions of the second service group. Details are not described herein again.

In an actual communication process, the first uplink data may further include uplink data corresponding to another service group, and the radio access network device processes uplink data of each service group similarly. Therefore, for ease of description of the solution, the following describes processing of the radio access network device only by using an example in which the first uplink data includes the uplink data of the first service group and/or the second service group. For actual processing of the uplink data of the another service group, refer to the following process.

Optionally, the resource scheduling method further includes the following step:

S308: The radio access network device determines a corresponding uplink resource based on the received first uplink data.

In a first implementation, the radio access network device determines that the first uplink data includes the first buffer status report information but does not include the service data of the first service group. The radio access network device determines a second uplink resource based on the first buffer status report information. The second uplink resource is used to carry the service data that is of the first service group and that is sent by the terminal device to the radio access network device.

In a second implementation, the radio access network device determines that the first uplink data includes the second buffer status report information but does not include the service data of the second service group. The radio access network device determines a third uplink resource based on the second buffer status report information. The third uplink resource is used to carry the service data that is of the second service group and that is sent by the terminal device to the radio access network device.

In a third implementation, the radio access network device determines that the first uplink data includes the first buffer status report information and the second buffer status report information but does not include the service data of the first service group or the service data of the second service group. The radio access network device determines a second uplink resource based on the first buffer status report information, and determines a third uplink resource based on the second buffer status report information. The second uplink resource is used to carry the service data that is of the first service group and that is sent by the terminal device to the radio access network device. The third uplink resource is used to carry the service data that is of the second service group and that is sent by the terminal device to the radio access network device.

Herein, it should be noted that, when a resource is sufficient, the first uplink data may include the first buffer status report information, the second buffer status report information, the service data of the first service group, and the service data of the second service group. In this case, the radio access network device receives the first uplink data, and a current resource scheduling method process ends. In the foregoing three implementations, subsequent steps of the resource scheduling method continue to be performed.

Optionally, the resource scheduling method further includes the following step:

S309: The radio access network device sends uplink scheduling information to the terminal device.

Corresponding to the first implementation in step S308, the uplink scheduling information is second uplink scheduling information, and the second uplink scheduling information is used to indicate the second uplink resource.

Corresponding to the second implementation in step S308, the uplink scheduling information is third uplink scheduling information, and the third uplink scheduling information is used to indicate the third uplink resource.

Corresponding to the third implementation in step S308, the uplink scheduling information is second uplink scheduling information and third uplink scheduling information, the second uplink scheduling information is used to indicate the second uplink resource, and the third uplink scheduling information is used to indicate the third uplink resource.

Optionally, in step S309, the second uplink scheduling information is used to notify the terminal device that an uplink resource indicated by the second uplink scheduling information corresponds to the first service group, and the third uplink scheduling information is used to notify the terminal device that an uplink resource indicated by the third uplink scheduling information corresponds to the second service group.

For formats and sending manners of the second uplink scheduling information and the third uplink scheduling information, refer to descriptions of the uplink scheduling information in step S304.

Optionally, the second uplink resource corresponds to the first service group, and the third uplink resource corresponds to the second service group. The radio access network device configures a corresponding uplink resource for each of the plurality of service groups. For a manner and a consideration of configuring the corresponding uplink resource for each service group, refer to descriptions in step S303.

Further, corresponding to the third implementation in step S308, the resource scheduling method further includes the following step:

S310: The terminal device receives the uplink scheduling information in step S309, and sends uplink data to the access network device.

Corresponding to the first implementation in step S308, the terminal device sends the service data of the first service group to the access network device by using the second uplink resource indicated by the second uplink scheduling information.

Corresponding to the second implementation in step S308, the terminal device sends the service data of the second service group to the access network device by using the third uplink resource indicated by the third uplink scheduling information.

Corresponding to the third implementation in step S308, the terminal device sends the service data of the first service group and the service data of the second service group to the access network device by using the second uplink resource indicated by the second uplink scheduling information.

It should be noted that step S310 corresponds to the third implementation in step S308, and a precondition for performing step S310 is as follows: The terminal device determines that, in addition to being used to carry the service data of the first service group, the second uplink resource has a sufficient remaining resource to carry the service data of the second service group. For specific determining and carrying manners, refer to descriptions in step S306. Based on this, the terminal device can send, on the second uplink resource corresponding to the first service group, service data corresponding to a plurality of service groups, thereby improving service processing efficiency.

Embodiment 2

FIG. 6 is a flowchart of a resource scheduling method according to Embodiment 2 of the present invention. The method specifically includes the following steps.

S600: A radio access network device sends service group configuration information to a terminal device, where the service group configuration information is used to instruct the terminal device to request an uplink resource based on the service group configuration information when the terminal device needs to send uplink data.

S601: The terminal device determines a first scheduling request based on uplink data, where the first scheduling request corresponds to a first service group, and the terminal device determines, based on the first service group, a first scheduling request resource used to send the first scheduling request.

S602: The terminal device sends the first scheduling request to the radio access network device by using the first scheduling request resource, where the first scheduling request is used to request the radio access network device to allocate an uplink resource.

Implementations of S600 to S602 are the same as those of steps S300 to S302 respectively. For details about processing procedures and characteristics of related terms (such as the service group configuration information, the first scheduling request, and the first scheduling request resource) mentioned in S600 to S602, refer to descriptions of steps S300 to S302 in Embodiment 1.

S603: The terminal device determines a second scheduling request based on the uplink data in step S601, where the second scheduling request corresponds to a second service group; and sends the second scheduling request by using the first scheduling request resource.

The second scheduling request is used to request the radio access network device to allocate an uplink resource for uplink data corresponding to the second service group.

S604: The radio access network device receives the first scheduling request and the second scheduling request from the terminal device by using the first scheduling request resource, and in response to the first scheduling request and the second scheduling request, the radio access network device determines a first uplink resource and a fourth uplink resource respectively.

S605: The radio access network device sends first uplink scheduling information and fourth uplink scheduling information to the terminal device.

The first uplink scheduling information is used to indicate the first uplink resource. The first uplink resource is used to carry uplink data that corresponds to the first service group and that is sent by the terminal device to the radio access network device. The fourth uplink scheduling information is used to indicate the fourth uplink resource. The fourth uplink resource is used to carry the uplink data that corresponds to the second service group and that is sent by the terminal device to the radio access network device.

S606: The terminal device receives the first uplink scheduling information and the fourth uplink scheduling information from the radio access network device, and determines uplink data corresponding to the first service group and uplink data corresponding to the second service group respectively.

According to the foregoing resource scheduling method in this embodiment, a same resource is used to send scheduling requests corresponding to a plurality of service groups, so as to improve utilization of an uplink resource. Particularly, when the plurality of service groups have corresponding priority information, scheduling may be performed for a service group having a relatively low priority while scheduling is preferably performed for a service group having a relatively high priority, thereby further improving service processing efficiency.

For the second scheduling request in step S603, refer to descriptions of the first scheduling request in step S301 in Embodiment 1. Specifically, the second scheduling request may include indication information, such as service group information, used to indicate the second service group corresponding to the second scheduling request. In Embodiment 2, when the second scheduling request is sent by using the first scheduling request resource corresponding to the first service group, the radio access network device may explicitly indicate, by using the indication information, that the second scheduling request is used by the terminal device to request a resource in response to the uplink data of the second service group. Further, according to a resource scheduling method or a corresponding apparatus in any embodiment of the present invention, in an actual implementation, there may be a third scheduling request, a fourth scheduling request, or more scheduling requests. For a format of each scheduling request, refer to descriptions of the first scheduling request in step S302 in Embodiment 1 and descriptions of the second scheduling request in this step.

In step S603, in an optional implementation, sending, by the terminal device, the first scheduling request and the second scheduling request on the first scheduling request resource may be implemented in the following manner.

Optionally, the first scheduling request resource indicates that data of the first service group needs to be sent, and information (for example, 1 bit) carried in a signal sent on the first scheduling request resource indicates that data of the second service group needs to be sent.

Optionally, information (for example, 1 bit) carried in a signal sent on the first scheduling request resource indicates whether data of the first service group and/or the second service group needs to be sent. Content specifically indicated by the information carried in the sent signal is pre-agreed on by the radio access network device and the terminal device, or is preconfigured by the radio access network device for the terminal device.

In another optional implementation, the terminal device determines at least one service type corresponding to the uplink data; determines, based on the service group configuration information received from the radio access network device, at least one service group corresponding to the at least one service type; and determines, from the at least one service group, the second service group different from the first service group.

For a manner of determining the second service group, refer to descriptions in step S306 in Embodiment 1. Details are not repeated herein.

In step S604, an implementation of determining the first uplink resource in response to the first scheduling request is the same as that in step S303. For details, refer to descriptions in step S303. Details are not repeated herein.

In an optional implementation, the radio access network device receives the second scheduling request on the first scheduling request resource, determines that the second scheduling request corresponds to the second service group, and configures the fourth uplink resource for the uplink data corresponding to the second service group.

Further, optionally, the fourth uplink resource corresponds to the second service group.

The radio access network device configures a corresponding uplink resource for each of the plurality of service groups. Based on this optional implementation, by separately configuring corresponding uplink resources for the plurality of service groups, grouped management and scheduling can be implemented for the uplink resources, and resource scheduling efficiency of the radio access network device is improved.

Specifically, for configuring, by the radio access network device, the corresponding uplink resource for each of the plurality of service groups, refer to related descriptions of configuring the corresponding first uplink resource for the first service group in step S303 in Embodiment 1.

Further, optionally, the radio access network device configures the corresponding uplink resource for each service group based on different priorities. Attributes of uplink resources corresponding to service groups in the plurality of service groups are different. For the resource attribute, refer to descriptions in step S303 in Embodiment 1.

It should be noted that an uplink resource of a service group having a relatively high priority may be used to transmit uplink data corresponding to a service group having a relatively low priority. However, an uplink resource of a service group having a relatively low priority cannot be used to transmit uplink data corresponding to a service group having a relatively high priority. Based on this, service data of a service group having a relatively high priority can be preferably processed. In addition, when a resource is sufficient, uplink data of a service group having a relatively low priority is further sent on an uplink resource of the service group having the relatively high priority, thereby improving resource utilization and service processing efficiency.

A meaning of the first uplink scheduling information in step S605 is the same as that of the first uplink scheduling information in step S304. For details, refer to descriptions in step S304.

In an optional implementation, the radio access network device sends the fourth uplink scheduling information to the terminal device, so that the terminal device may determine that the fourth uplink scheduling information corresponds to the second service group. Specifically, the radio access network device may process uplink scheduling information in a plurality of manners, so that the terminal device may determine a service group corresponding to the received uplink scheduling information.

For content and a processing manner of the fourth uplink scheduling information, refer to related descriptions of a format and processing of the uplink scheduling information in step S304 in Embodiment 1. Details are not repeated herein.

In step S606, the uplink data corresponding to the first service group includes first buffer status report information, and may further include service data of the first service group; and the uplink data corresponding to the second service group includes second buffer status report information, and may further include service data of the second service group. For explanations of the first buffer status report information and the second buffer status report information in S606, refer to descriptions in Embodiment 1. Details are not repeated herein.

Optionally, in this embodiment, the resource scheduling method further includes the following steps:

S607: The terminal device sends, by using the first uplink resource indicated by the first uplink scheduling information, the uplink data corresponding to the first service group, and further sends, by using the fourth uplink resource indicated by the fourth uplink scheduling information, the uplink data corresponding to the second service group.

S608: Alternatively, the terminal device sends, by using the first uplink resource indicated by the first uplink scheduling information, the uplink data corresponding to the first service group and the uplink data corresponding to the second service group.

For example, if the terminal device determines that, in addition to being used to carry the uplink data corresponding to the first service group, the first uplink resource has an available remaining resource, the terminal device sends, by using the first uplink resource, the uplink data corresponding to the second service group.

Further, it should be noted that, when the terminal device sends uplink data not belonging to the first service group on the first uplink resource corresponding to the first service group, identity information (such as service group information or service type information) used to indicate a service group corresponding to the uplink data not belonging to the first service group needs to be added to the uplink data not belonging to the first service group, so that the radio access network device may explicitly determine a service group corresponding to the uplink data. A specific location for adding or a specific format is not specifically limited herein. This description is applicable to all cases in this embodiment of the present invention in which a terminal device does not send uplink data of a current service group on an uplink resource corresponding to the current service group.

Optionally, the resource scheduling method further includes the following step:

S609: The radio access network device receives the uplink data sent by the terminal device, and determines the uplink data.

Corresponding to the implementation of S607, the radio access network device receives, by using the first uplink resource, the uplink data corresponding to the first service group, and receives, by using the fourth uplink resource, the uplink data corresponding to the second service group.

Corresponding to the implementation of S608, the radio access network device receives, by using the first uplink resource, the uplink data corresponding to the first service group and the uplink data corresponding to the second service group.

Further, in step S609:

Optionally, the radio access network device determines that the uplink data corresponding to the first service group includes the first buffer status report information but does not include the service data of the first service group. The radio access network device determines a second uplink resource based on the first buffer status report information. The second uplink resource is used to carry the service data that is of the first service group and that is sent by the terminal device to the radio access network device. Alternatively, the radio access network device determines that the uplink data corresponding to the first service group includes the first buffer status report information and the service data of the first service group. In this case, a current resource scheduling process for the first service group ends.

Further, optionally, the radio access network device determines that the uplink data corresponding to the second service group includes the second buffer status report information but does not include the service data of the second service group. The radio access network device determines a third uplink resource based on the second buffer status report information. The third uplink resource is used to carry the service data that is of the second service group and that is sent by the terminal device to the radio access network device. Alternatively, the radio access network device determines that the uplink data corresponding to the second service group includes the second buffer status report information and the service data of the second service group. In this case, a current resource scheduling process for the second service group ends.

If a current resource scheduling process for at least one of the first service group and the second service group is not completed, the radio access network device continues to perform step S610.

S610: The radio access network device sends uplink scheduling information to the terminal device.

Optionally, the uplink scheduling information includes second uplink scheduling information, and the second uplink scheduling information is used to indicate the second uplink resource.

Further, optionally, the uplink scheduling information includes third uplink scheduling information, and the third uplink scheduling information is used to indicate the third uplink resource.

Further, optionally, the uplink scheduling information includes second uplink scheduling information and third uplink scheduling information, the second uplink scheduling information is used to indicate the second uplink resource, and the third uplink scheduling information is used to indicate the third uplink resource.

Optionally, in step S610, the second uplink scheduling information is used to notify the terminal device that an uplink resource indicated by the second uplink scheduling information corresponds to the first service group, and/or the third uplink scheduling information is used to notify the terminal device that an uplink resource indicated by the third uplink scheduling information corresponds to the second service group.

For formats and sending manners of the second uplink scheduling information and the third uplink scheduling information, refer to descriptions of the uplink scheduling information in step S304.

S611: The terminal device receives the uplink scheduling information in step S610, and sends uplink data to the radio access network device.

In step S611, the terminal device determines a corresponding resource indicated by the uplink scheduling information, for example, determines at least one of the second uplink resource corresponding to the first service group and the third uplink resource corresponding to the second service group, and sends service data of a corresponding service group. For details, refer to descriptions of related content in Embodiment 1.

For all the foregoing embodiments of the present invention, it should be noted that the terminal device receives the uplink data from a higher layer, determines the at least one service type corresponding to the uplink data, and determines, based on the service group configuration information received from the radio access network device, the at least one service group corresponding to the at least one service type. Specifically, the uplink data triggers a buffer status report BSR, and further triggers a scheduling request SR corresponding to each service group. According to the manner described in the foregoing embodiments, the first scheduling request that corresponds to the first service group and that needs to be sent is determined (optionally, there is also the second scheduling request corresponding to the second service group, or based on an actual scenario, there may be more scheduling requests), one or more determined scheduling requests are sent to the radio access network device, and another scheduling request for another service group is cancelled or ignored. Alternatively, only the first scheduling request that needs to be sent may be triggered (optionally, there is also the second scheduling request corresponding to the second service group, or based on an actual scenario, there may be more scheduling requests), and a scheduling request corresponding to another service group is not triggered. This is not limited in this embodiment of the present invention. A specific trigger manner may be agreed on or configured according to a requirement of the radio access network device or the terminal device.

In addition, it should be noted that, in the prior art, in response to a received scheduling request, a radio access network device sends, to a terminal device, uplink scheduling information that indicates an uplink resource. The uplink resource is used to carry buffer status report information sent by the terminal device to the radio access network device. The buffer status report information is used to indicate an amount of to-be-sent uplink data buffered by the terminal device. In other words, a resource size of the uplink resource is sufficient for the uplink resource to carry the buffer status report information. Further, in response to the buffer status report information received by using the uplink resource, the radio access network device configures another uplink resource for the terminal device. The another uplink resource is used to carry uplink data sent by the terminal device to the radio access network device. In all the foregoing embodiments of the present invention, the radio access network device obtains the plurality of service groups through division and configures the corresponding scheduling request resource for each service group. Based on this implementation, scheduling may be preferably performed for a specific service group, and an uplink data amount corresponding to the service group is not large. In this case, an uplink resource configured by the radio access network device in response to a scheduling request for the service group may be used to carry both buffer status report information of the service group and service data of the service group. Therefore, in all the embodiments of the present invention, uplink resources may be configured according to prior-art manners of configuring different uplink resources used to carry different uplink data (for example, buffer status report information and service data). Alternatively, a resource used to carry uplink data corresponding to each of a plurality of service groups may be uniformly configured, without the foregoing differentiation. In all the embodiments of the present invention, such configurations of resources used to carry uplink data are not specifically classified or limited, and a resource may be specifically configured according to an implementation or a requirement of the radio access network device.

In the embodiments of this application, sequence numbers of the steps constitute no limitation on execution sequences. The execution sequences of the steps should be determined based on functions and internal logic of the steps, and are not limited in the embodiments of this application.

Figure 7:
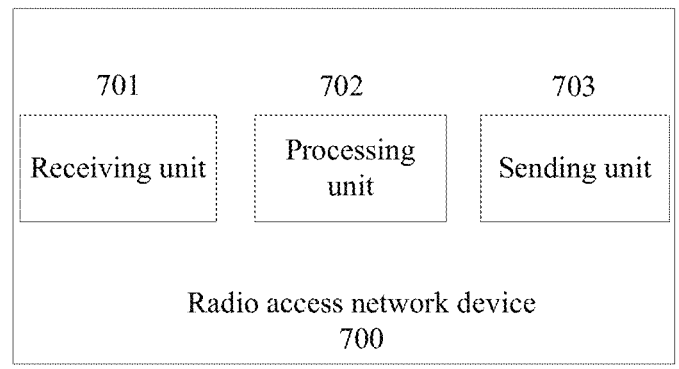
FIG. 7 is a structural diagram of a radio access network device according to an embodiment of the present invention.

FIG. 7 is a structural diagram of an access network device according to an embodiment of the present invention. The access network device 700 includes:

a receiving unit 701, configured to receive a first scheduling request from a terminal device by using a first scheduling request resource, where the first scheduling request resource corresponds to a first service group in a plurality of service groups, and the first scheduling request is used to request the access network device to allocate an uplink resource;

a processing unit 702, configured to determine a first uplink resource in response to the first scheduling request, where the first uplink resource is used to carry uplink data that corresponds to the first service group and that is sent by the terminal device to the access network device; and a sending unit 703, configured to send first uplink scheduling information to the terminal device, where the first uplink scheduling information is used to indicate the first uplink resource; where each of the plurality of service groups corresponds to one scheduling request resource.

According to an actual requirement, the access network device may further include a storage unit 704, which is not shown in the figure.

Further, the receiving unit 701 is further configured to receive first uplink data from the terminal device by using the first uplink resource. The first uplink data includes first buffer status report information. The first buffer status report information is used to indicate a data amount of service data that is of the first service group and that is buffered by the terminal device.

The processing unit 702 is further configured to determine a second uplink resource based on the first buffer status report information if the first uplink data does not include the service data of the first service group. The second uplink resource is used to carry the service data that is of the first service group and that is sent by the terminal device to the access network device.

The sending unit is further configured to send second uplink scheduling information to the terminal device. The second uplink scheduling information is used to indicate the second uplink resource.

The processing unit 702 is further configured to skip determining the second uplink resource if the processing unit 702 determines that the first uplink data further includes the service data of the first service group.

Further, the processing unit 702 is further configured to determine that the first uplink data further includes second buffer status report information. The second buffer status report information is used to indicate a data amount of service data that is of a second service group and that is buffered by the terminal device. The second service group is a service group, different from the first service group, in the plurality of service groups.

Then the processing unit 702 is further configured to determine whether the first uplink data further includes the service data of the second service group. If the first uplink data further does not include the service data of the second service group, the processing unit 702 is further configured to determine a third uplink resource based on the second buffer status report information. The third uplink resource is used to carry the service data that is of the second service group and that is sent by the terminal device to the access network device. The sending unit 703 is configured to send third uplink scheduling information to the terminal device. The third uplink scheduling information is used to indicate the third uplink resource.

If the processing unit 702 determines that the first uplink data includes both the second buffer status report information and the service data of the second service group, the processing unit skips determining the third uplink resource.

Further, the receiving unit 701 is further configured to receive a second scheduling request from the terminal device by using the first scheduling request resource. The second scheduling request is used to request the access network device to allocate an uplink resource for uplink data of the second service group.

The processing unit 702 is configured to determine a fourth uplink resource in response to the second scheduling request. The fourth uplink resource is used to carry the uplink data that corresponds to the second service group and that is sent by the terminal device to the radio access network device.

The sending unit 703 is further configured to send fourth uplink scheduling information to the terminal device. The fourth uplink scheduling information is used to indicate the fourth uplink resource. The second service group is a service group, different from the first service group, in the plurality of service groups.

Further, the receiving unit 701 is further configured to receive, by using the first uplink resource or the fourth uplink resource, the uplink data corresponding to the second service group. The uplink data corresponding to the second service group includes the second buffer status report information corresponding to the second service group. The second buffer status report information is used to indicate the data amount of the service data that is of the second service group and that is buffered by the terminal device.

Further, the processing unit 702 is specifically configured to obtain the plurality of service groups through division. For the service group division, refer to descriptions in step S300 in Embodiment 1.

It should be noted that, for a specific implementation of performing resource scheduling processing by the access network device 700, reference may be made to descriptions of the resource scheduling methods provided in Embodiment 1 and Embodiment 2 of the present invention. The access network device 700 in this embodiment is based on a same concept as the resource scheduling methods provided in Embodiment 1 and Embodiment 2 corresponding to FIG. 3 and FIG. 6 respectively. A technical effect brought by the access network device 700 is the same as that brought by the foregoing resource scheduling methods. Specific functions of the receiving unit 701, the processing unit 702, the sending unit 703, and the storage unit 704 that are included in the access network device in this embodiment, and any features, terms, and implementation details thereof correspond to functions of the access network device in the method embodiments corresponding to FIG. 3 and FIG. 6. For specific content, refer to descriptions in the method embodiments corresponding to FIG. 3 and FIG. 6 in the present invention. Details are not described herein again.

It should be noted that, in the foregoing embodiment, the access network device may be fully or partially implemented by software, hardware, firmware, or any combination thereof.

In an optional manner, corresponding functional units in the foregoing embodiment may be implemented by corresponding hardware; or may be implemented by corresponding hardware executing corresponding software. For example, the receiving unit 701 may be hardware, such as a receiver, that can execute the foregoing function of the receiving module; or may be a general processor or another hardware device that can execute a corresponding computer program so as to complete the foregoing function. For another example, the processing unit 702 may be hardware, such as a processor, that can execute the foregoing function of the processing module; or may be another hardware device that can execute a corresponding computer program so as to complete the foregoing function. For still another example, the sending unit 703 may be hardware, such as a transmitter, that can execute the foregoing function of the sending module; or may be a general processor or another hardware device that can execute a corresponding computer program so as to complete the foregoing function.

Figure 8:
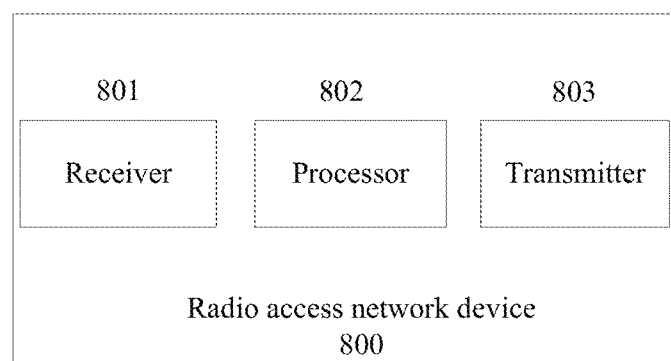
FIG. 8 is a structural diagram of another radio access network device according to an embodiment of the present invention.

FIG. 8 is a structural diagram of another access network device according to an embodiment of the present invention. The access network device 800 includes:

a receiver 801, configured to receive a first scheduling request from a terminal device by using a first scheduling request resource, where the first scheduling request resource corresponds to a first service group in a plurality of service groups, and the first scheduling request is used to request the access network device to allocate an uplink resource;

a processor 802, configured to determine a first uplink resource in response to the first scheduling request, where the first uplink resource is used to carry uplink data that corresponds to the first service group and that is sent by the terminal device to the access network device; and a transmitter 803, configured to send first uplink scheduling information to the terminal device, where the first uplink scheduling information is used to indicate the first uplink resource; where each of the plurality of service groups corresponds to one scheduling request resource.

According to an actual requirement, the access network device may further include a memory 804, which is not shown in the figure.

It should be noted that, for a specific implementation of performing resource scheduling processing by the access network device 800, reference may be made to descriptions of the resource scheduling methods provided in Embodiment 1 and Embodiment 2 of the present invention. The access network device 800 in this embodiment is based on a same concept as the resource scheduling methods provided in Embodiment 1 and Embodiment 2 corresponding to FIG. 3 and FIG. 6 respectively. A technical effect brought by the access network device 800 is the same as that brought by the foregoing resource scheduling methods. Specific functions of the receiver 801, the processor 802, the transmitter 803, and the memory 804 that are included in the access network device in this embodiment, and any features, terms, and implementation details thereof correspond to functions of the access network device in the method embodiments corresponding to FIG. 3 and FIG. 6. For specific content, refer to descriptions in the method embodiments corresponding to FIG. 3 and FIG. 6 in the present invention. Details are not described herein again.

In another optional manner, when the functional units are implemented by software, all or some of the functional units may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or may be a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state disk Solid State Disk (SSD)), or the like.

Figure 9:
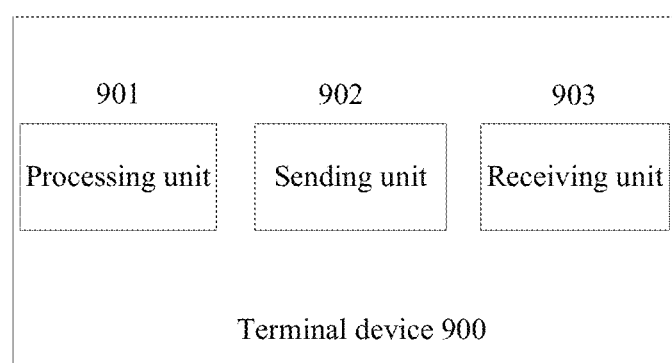
FIG. 9 is a structural diagram of a terminal device according to an embodiment of the present invention.

FIG. 9 is a structural diagram of a terminal device according to an embodiment of the present invention. The terminal device 900 includes:

a processing unit 901, configured to determine a first scheduling request based on uplink data, where the first scheduling request corresponds to a first service group; where the processing unit 901 is further configured to determine, based on the first service group, a first scheduling request resource used to send the first scheduling request, where the first service group is one of a plurality of service groups, and each of the plurality of service groups corresponds to one scheduling request resource; and a sending unit 902, configured to send the first scheduling request to an access network device by using the first scheduling request resource, where the first scheduling request is used to request the access network device to allocate an uplink resource.

According to an actual requirement, the terminal device 900 may further include a storage unit 904, which is not shown in the figure.

Further, the terminal device 900 includes a receiving unit 903.

The receiving unit 903 is configured to receive first uplink scheduling information from the access network device. The first uplink scheduling information is used to indicate a first uplink resource. The first uplink resource is used to carry uplink data that corresponds to the first service group and that is sent by the terminal device to the access network device.

The sending unit 902 is further configured to send first uplink data to the access network device by using the first uplink resource. The first uplink data includes first buffer status report information. The first buffer status report information is used to indicate a data amount of service data that is of the first service group and that is buffered by the terminal device.

Further, the receiving unit 903 is further configured to receive second uplink scheduling information from the access network device. The second uplink scheduling information is used to indicate a second uplink resource. The second uplink resource is used to carry the service data that is of the first service group and that is sent by the terminal device to the access network device.

The sending unit 902 is further configured to send the service data of the first service group to the access network device by using the second uplink resource.

Further, the receiving unit 903 is further configured to receive third uplink scheduling information from the access network device. The third uplink scheduling information is used to indicate a third uplink resource. The third uplink resource is used to carry service data that is of second service group and that is sent by the terminal device to the access network device.

The sending unit 902 is further configured to send the service data of the second service group to the access network device by using the third uplink resource.

Further, the processing unit 901 is further configured to determine a second scheduling request based on the uplink data. The second scheduling request corresponds to the second service group.

The sending unit 902 is further configured to send the second scheduling request to the access network device by using the first scheduling request resource. The second scheduling request is used to request the access network device to allocate an uplink resource for uplink data corresponding to the second service group. The second service group is a service group, different from the first service group, in the plurality of service groups.

Further, the receiving unit 903 is further configured to receive fourth uplink scheduling information from the access network device. The fourth uplink scheduling information is used to indicate a fourth uplink resource. The fourth uplink resource is used to carry the uplink data that corresponds to the second service group and that is sent by the terminal device to the access network device.

The sending unit 902 is further configured to send, to the access network device by using the fourth uplink resource, the uplink data corresponding to the second service group. The uplink data corresponding to the second service group includes second buffer status report information corresponding to the second service group. The second buffer status report information is used to indicate a data amount of the service data that is of the second service group and that is buffered by the terminal device.

Further, the processing unit 901 is further configured to determine at least one service group corresponding to the uplink data; and is further configured to determine the first scheduling request corresponding to the first service group if the first service group in the at least one service group has a highest priority.

Further, the processing unit 901 is further configured to determine that the first scheduling request resource and a fifth uplink resource overlap in a first time period. The fifth uplink resource is used to carry uplink data that corresponds to a third service group and that is sent by the terminal device to the access network device.

Further, the processing unit 901 is further configured to determine that a priority of the third service group is higher than the priority of the first service group, and send the uplink data of the third service group by using the fifth uplink resource; and the sending unit is configured to send the first scheduling request on a resource, other than the first time period, of the first scheduling request resource.

It should be noted that, for a specific implementation of performing resource scheduling processing by the terminal device 900, reference may be made to descriptions of the resource scheduling methods provided in Embodiment 1 and Embodiment 2 of the present invention. The terminal device 900 in this embodiment is based on a same concept as the resource scheduling methods provided in Embodiment 1 and Embodiment 2 corresponding to FIG. 3 and FIG. 6 respectively. A technical effect brought by the terminal device 900 is the same as that brought by the foregoing resource scheduling methods. Specific functions of the processing unit 901, the sending unit 902, the receiving unit 903, and the storage unit 904 that are included in the terminal device in this embodiment, and any features, terms, and implementation details thereof correspond to functions of the terminal device in the method embodiments corresponding to FIG. 3 and FIG. 6. For specific content, refer to descriptions in the method embodiments corresponding to FIG. 3 and FIG. 6 in the present invention. Details are not described herein again.

It should be noted that, in the foregoing embodiment, the terminal device may be fully or partially implemented by software, hardware, firmware, or any combination thereof.

In an optional manner, corresponding functional units in the foregoing embodiment may be implemented by corresponding hardware; or may be implemented by corresponding hardware executing corresponding software. For example, the processing unit 901 may be hardware, such as a processor, that can execute the foregoing function of the processing module; or may be another hardware device that can execute a corresponding computer program so as to complete the foregoing function. For another example, the sending unit 902 may be hardware, such as a transmitter, that can execute the foregoing function of the sending module; or may be a general processor or another hardware device that can execute a corresponding computer program so as to complete the foregoing function. For still another example, the receiving unit 903 may be hardware, such as a receiver, that can execute the foregoing function of the receiving module; or may be a general processor or another hardware device that can execute a corresponding computer program so as to complete the foregoing function.

Figure 10:
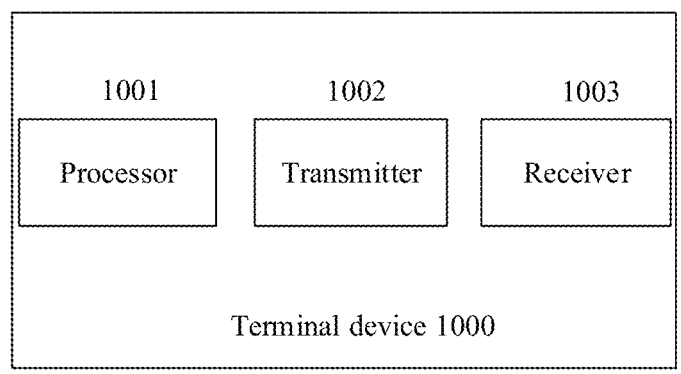
FIG. 10 is a structural diagram of another terminal device according to an embodiment of the present invention.

FIG. 10 is a structural diagram of another terminal device according to an embodiment of the present invention. The terminal device 1000 includes:

a processor 1001, configured to determine a first scheduling request based on uplink data, where the first scheduling request corresponds to a first service group; where the processor 1001 is further configured to determine, based on the first service group, a first scheduling request resource used to send the first scheduling request, where the first service group is one of a plurality of service groups, and each of the plurality of service groups corresponds to one scheduling request resource; and a transmitter 1002, configured to send the first scheduling request to an access network device by using the first scheduling request resource, where the first scheduling request is used to request the access network device to allocate an uplink resource.

Further, the terminal device 1000 includes a receiver 1003.

The receiver 1003 is configured to receive first uplink scheduling information from the access network device. The first uplink scheduling information is used to indicate a first uplink resource. The first uplink resource is used to carry uplink data that corresponds to the first service group and that is sent by the terminal device to the access network device.

The transmitter 1002 is further configured to send first uplink data to the access network device by using the first uplink resource. The first uplink data includes first buffer status report information. The first buffer status report information is used to indicate a data amount of service data that is of the first service group and that is buffered by the terminal device.

According to an actual requirement, the terminal device 1000 may further include a storage unit 1004, which is not shown in the figure.

It should be noted that, for a specific implementation of performing resource scheduling processing by the terminal device 1000, reference may be made to descriptions of the resource scheduling methods provided in Embodiment 1 and Embodiment 2 of the present invention. The terminal device 1000 in this embodiment is based on a same concept as the resource scheduling methods provided in Embodiment 1 and Embodiment 2 corresponding to FIG. 3 and FIG. 6 respectively. A technical effect brought by the terminal device 1000 is the same as that brought by the foregoing resource scheduling methods. Specific functions of the processor 1001, the transmitter 1002, the receiver 1003, and the memory 1004 that are included in the terminal device in this embodiment, and any features, terms, and implementation details thereof correspond to functions of the terminal device in the method embodiments corresponding to FIG. 3 and FIG. 6. For specific content, refer to descriptions in the method embodiments corresponding to FIG. 3 and FIG. 6 in the present invention. Details are not described herein again.

In another optional manner, when the functional units are implemented by software, all or some of the functional units may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or may be a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state disk Solid State Disk (SSD)), or the like.

An embodiment of the present invention further provides a communications system. The communications system includes at least one radio access network device and at least one terminal device that are configured to execute the foregoing embodiments of the present invention.

It should be understood that "one embodiment", "an embodiment", or "an embodiment of the present invention" mentioned in the whole specification means that particular features, structures, or characteristics related to the embodiment are included in at least one embodiment of the present invention. Therefore, "in one embodiment", "in an embodiment", or "in an embodiment of the present invention" that appears throughout the whole specification does not necessarily mean a same embodiment. Moreover, the particular characteristic, structure, or property may be combined in one or more embodiments in any proper manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention. The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

The foregoing mainly describes the solutions provided in the embodiments of the present invention from a perspective of interaction between network elements. It may be understood that, to implement the foregoing functions, the network elements, such as the terminal device and the radio access network device, include a corresponding hardware structure and/or software module for performing each of the functions. A person of ordinary skill in the art should be easily aware that the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

The descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a terminal device, service group configuration information from a radio access network device, wherein the service group configuration information comprises service group information, service type information, and scheduling request resource information, the service group information is used to indicate a logical channel group identity, the service type information comprises service type identity information that is used to indicate a logical channel identity or a priority corresponding to a service type, and the scheduling request resource information comprises first resource indication information that is used to indicate a resource used by the terminal device to send a scheduling request for a corresponding service group;
determining, by the terminal device, a first scheduling request based on uplink data, wherein the first scheduling request corresponds to a first service group;
determining, by the terminal device based on the service group configuration information, a first scheduling request resource corresponding to the first service group and used to send the first scheduling request; and
sending, by the terminal device, the first scheduling request to the radio access network device using the first scheduling request resource, wherein the first scheduling request is used to request the radio access network device to allocate an uplink resource.

2. The method according to claim 1, comprising:
receiving, by the terminal device, first uplink scheduling information from the radio access network device, wherein the first uplink scheduling information is used to indicate a first uplink resource; and
sending, by the terminal device, first uplink data to the radio access network device using the first uplink resource.

3. The method according to claim 1, wherein the first service group is one of a plurality of service groups, and each of the plurality of service groups corresponds to one scheduling request resource.

4. The method according to claim 1, further comprising:
determining, by the terminal device, a second scheduling request based on the uplink data, wherein the second scheduling request corresponds to a second service group; and
sending, by the terminal device, the second scheduling request to the radio access network device using the first scheduling request resource,
wherein the second scheduling request is used to request the radio access network device to allocate an uplink resource for uplink data corresponding to the second service group,
wherein the second service group is a service group, different from the first service group, in the plurality of service groups.

5. The method according to claim 1, wherein the determining, by the terminal device, the first scheduling request based on uplink data comprises:
determining, by the terminal device, at least one service group corresponding to the uplink data; and
determining the first scheduling request corresponding to the first service group based on the terminal device determining that the first service group in the at least one service group has a highest priority.

6. The method according to claim 1, further comprising:
before the terminal device sends the first scheduling request to the radio access network device using the first scheduling request resource, determining, by the terminal device, that the first scheduling request resource and an uplink resource overlap in a time period, wherein the uplink resource is used to carry uplink data that corresponds to a second service group and that is sent by the terminal device to the radio access network device;
determining, by the terminal device, a priority of the first service group and a priority of the second service group based on the service group configuration information; and
determining, by the terminal device, when a priority of the second service group is lower than a priority of the first service group, to send the first scheduling request on the time period.

7. A resource scheduling method, comprising:
sending, by a radio access network device, service group configuration information to a terminal device, wherein the service group configuration information comprises service group information, service type information, and scheduling request resource information, the service group information is used to indicate a logical channel group identity, the service type information comprises service type identity information that is used to indicate a logical channel identity or a priority corresponding to a service type, and the scheduling request resource information comprises first resource indication information that is used to indicate a resource used by the terminal device to send a scheduling request for a corresponding service group; and
receiving, by the radio access network device, a first scheduling request from the terminal device using a first scheduling request resource, wherein the first scheduling request corresponds to a first service group and is used to request the radio access network device to allocate an uplink resource, and the first scheduling request resource corresponds to the first service group and is used to send the first scheduling request.

8. The resource scheduling method according to claim 7, comprising:
sending, by the radio access network device, first uplink scheduling information to the terminal device, wherein the first uplink scheduling information is used to indicate a first uplink resource; and
receiving, by the radio access network device, first uplink data from the terminal device using the first uplink resource.

9. The resource scheduling method according to claim 8, wherein the first service group is one of a plurality of service groups, and each of the plurality of service groups corresponds to one scheduling request resource.

10. The resource scheduling method according to claim 7, comprising:
receiving, by the radio access network device, a second scheduling request from the terminal device using the first scheduling request resource, wherein the second scheduling request corresponds to a second service group, and the second service group is a service group, different from the first service group, in a plurality of service groups.

11. The resource scheduling method according to claim 7, comprising:

when the first scheduling request resource and a uplink resource overlap in a time period, receiving, by the radio access network device, the first scheduling request on the time period based on a priority of the second service group being lower than a priority of the first service group, wherein the uplink resource is used to carry uplink data that corresponds to a second service group and that is sent by the terminal device to the radio access network device.

12. An apparatus, which is a terminal device or is applicable in the terminal device, comprising:
one or more processors; and
a non-transitory memory coupled to the one or more processors, having computer-executable instructions stored thereon, the computer-executable instructions, when executed by the one or more processors, cause the terminal device to:
receive service group configuration information from a radio access network device, wherein the service group configuration information comprises service group information, service type information, and scheduling request resource information, the service group information is used to indicate a logical channel group identity, the service type information comprises service type identity information that is used to indicate a logical channel identity or a priority corresponding to a service type, and the scheduling request resource information comprises first resource indication information that is used to indicate a resource used by the terminal device to send a scheduling request for a corresponding service group;
determine a first scheduling request based on uplink data, wherein the first scheduling request corresponds to a first service group;
determine, based on the service group configuration information, a first scheduling request resource corresponding to the first service group and used to send the first scheduling request; and
send the first scheduling request to the radio access network device using the first scheduling request resource, wherein the first scheduling request is used to request the radio access network device to allocate an uplink resource.

13. The apparatus according to claim 12, wherein the one or more processors execute the instructions to cause the terminal device further to:
receive first uplink scheduling information from the radio access network device, wherein the first uplink scheduling information is used to indicate a first uplink resource; and
send first uplink data to the radio access network device using the first uplink resource.

14. The apparatus according to claim 12, wherein the first service group is one of a plurality of service groups, and each of the plurality of service groups corresponds to one scheduling request resource.

15. The apparatus according to claim 12, wherein the one or more processors execute the instructions to cause the terminal device further to:
determine a second scheduling request based on the uplink data, wherein the second scheduling request corresponds to a second service group; and
send the second scheduling request to the radio access network device using the first scheduling request resource, wherein the second scheduling request is used to request the radio access network device to allocate an uplink resource for uplink data corresponding to the second service group, wherein the second service group is a service group, different from the first service group, in the plurality of service groups.

16. The apparatus according to claim 12, wherein the determining the first scheduling request based on uplink data comprises:

determining at least one service group corresponding to the uplink data; and determining the first scheduling request corresponding to the first service group based on a determination that the first service group in the at least one service group has a highest priority.

17. The apparatus according to claim 12, wherein the one or more processors execute the instructions to cause the terminal device further to:

before sending the first scheduling request to the radio access network device using the first scheduling request resource, determine that the first scheduling request resource and an uplink resource overlap in a time period, wherein the uplink resource is used to carry uplink data that corresponds to a second service group and that is sent by the terminal device to the radio access network device;

determine a priority of the first service group and a priority of the second service group based on the service group configuration information; and determine, when a priority of the second service group is lower than a priority of the first service group, to send the first scheduling request on the time period.

18. An apparatus, which is a radio access network device or is applicable in the radio access network device, comprising:

one or more processors; and a non-transitory memory coupled to the one or more processors, having computer-executable instructions stored thereon, the computer-executable instructions, when executed by the one or more processors, cause the radio access network device to:

send service group configuration information to a terminal device, wherein the service group configuration information comprises service group information, service type information, and scheduling request resource information, the service group information is used to indicate a logical channel group identity, the service type information comprises service type identity information that is used to indicate a logical channel identity or a priority corresponding to a service type, and the scheduling request resource information comprises first resource indication information that is used to indicate a resource used by the terminal device to send a scheduling request for a corresponding service group; and receive a first scheduling request from the terminal device using a first scheduling request resource, wherein the first scheduling request corresponds to a first service group and is used to request the radio access network device to allocate an uplink resource, and the first scheduling request resource corresponds to the first service group and is used to send the first scheduling request.

19. The apparatus according to claim 18, wherein the one or more processors execute the instructions to cause the radio access network device further to:

send first uplink scheduling information to the terminal device, wherein the first uplink scheduling information is used to indicate a first uplink resource; and receive first uplink data from the terminal device using the first uplink resource.

20. The apparatus according to claim 19, wherein the first service group is one of a plurality of service groups, and each of the plurality of service groups corresponds to one scheduling request resource.

21. The apparatus according to claim 18, wherein the one or more processors execute the instructions to cause the radio access network device further to:

receive a second scheduling request from the terminal device using the first scheduling request resource, wherein the second scheduling request corresponds to a second service group, and the second service group is a service group, different from the first service group, in a plurality of service groups.

22. The apparatus according to claim 18, wherein the one or more processors execute the instructions to cause the radio access network device further to:

when the first scheduling request resource and a uplink resource overlap in a time period, receive the first scheduling request on the time period based on a priority of the second service group being lower than a priority of the first service group, wherein the uplink resource is used to carry uplink data that corresponds to a second service group and that is sent by the terminal device to the radio access network device.

* * * * *